United States Patent
Lamont

(10) Patent No.: US 10,984,243 B2
(45) Date of Patent: *Apr. 20, 2021

(54) SYSTEMS AND METHODS FOR USING AUGMENTED REALITY TO LOCATE OBJECTS, IDENTIFY PERSONS, AND INTERACT WITH INANIMATE OBJECTS

(71) Applicant: Carl Lamont, St. George, UT (US)

(72) Inventor: Carl Lamont, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,149

(22) Filed: Jul. 28, 2020

(65) Prior Publication Data

US 2020/0356777 A1  Nov. 12, 2020

Related U.S. Application Data

(63) Continuation of application No. 16/825,733, filed on Mar. 20, 2020, now Pat. No. 10,726,267, which is a continuation-in-part of application No. 16/514,048, filed on Jul. 17, 2019, now Pat. No. 10,598,507.

(60) Provisional application No. 62/772,205, filed on Nov. 28, 2018.

(51) Int. Cl.
| | |
|---|---|
| G08B 21/00 | (2006.01) |
| G06K 9/00 | (2006.01) |
| G06Q 30/06 | (2012.01) |
| G06T 19/00 | (2011.01) |
| G06F 3/01 | (2006.01) |
| G06T 7/73 | (2017.01) |

(52) U.S. Cl.
CPC .......... *G06K 9/00671* (2013.01); *G06F 3/011* (2013.01); *G06K 9/00208* (2013.01); *G06Q 30/0643* (2013.01); *G06T 7/74* (2017.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2003/0221130 | A1* | 11/2003 | Henry | ..................... H04L 63/12 726/5 |
| 2005/0231746 | A1* | 10/2005 | Parry | ................. H04N 1/32144 358/1.13 |
| 2018/0174125 | A1* | 6/2018 | Mao | ..................... G07F 11/165 |

* cited by examiner

*Primary Examiner* — Julie B Lieu
(74) *Attorney, Agent, or Firm* — Gurr Brande & Spendlove, PLLC; Robert A. Gurr

(57) ABSTRACT

A system is provided which utilizes multiple combinations of object location technology to locate objects and direct users to them, and which provides reliable owner recognition and ownership verification with the use of displayed augmented reality with a predefined image of the object and/or the user. Further, the system utilizes augmented reality fingerprint markers. When the augmented reality fingerprint marker is positioned on an object and scanned with a smart device, information relating to the object is superimposed on the object displayed on the smart device.

9 Claims, 27 Drawing Sheets

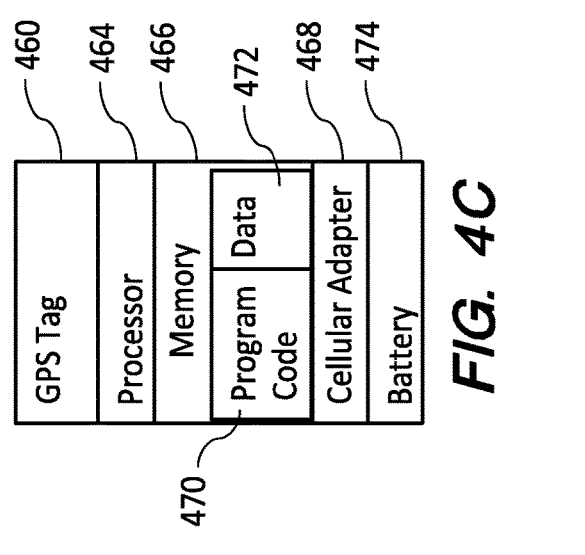
FIG. 4B
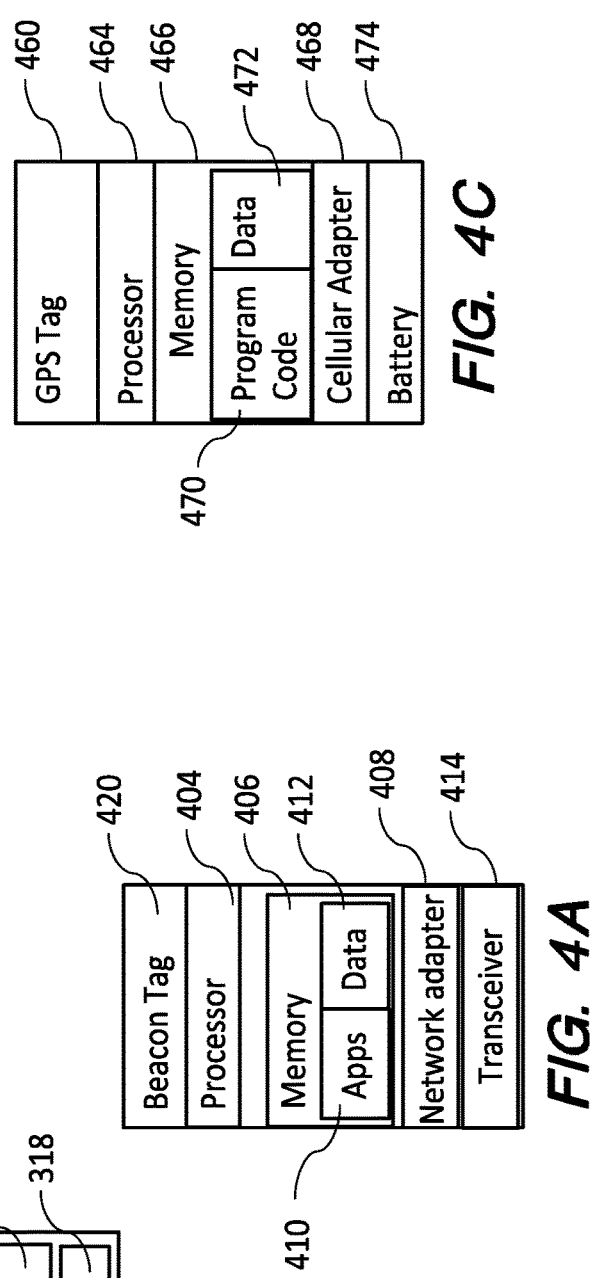
FIG. 4C
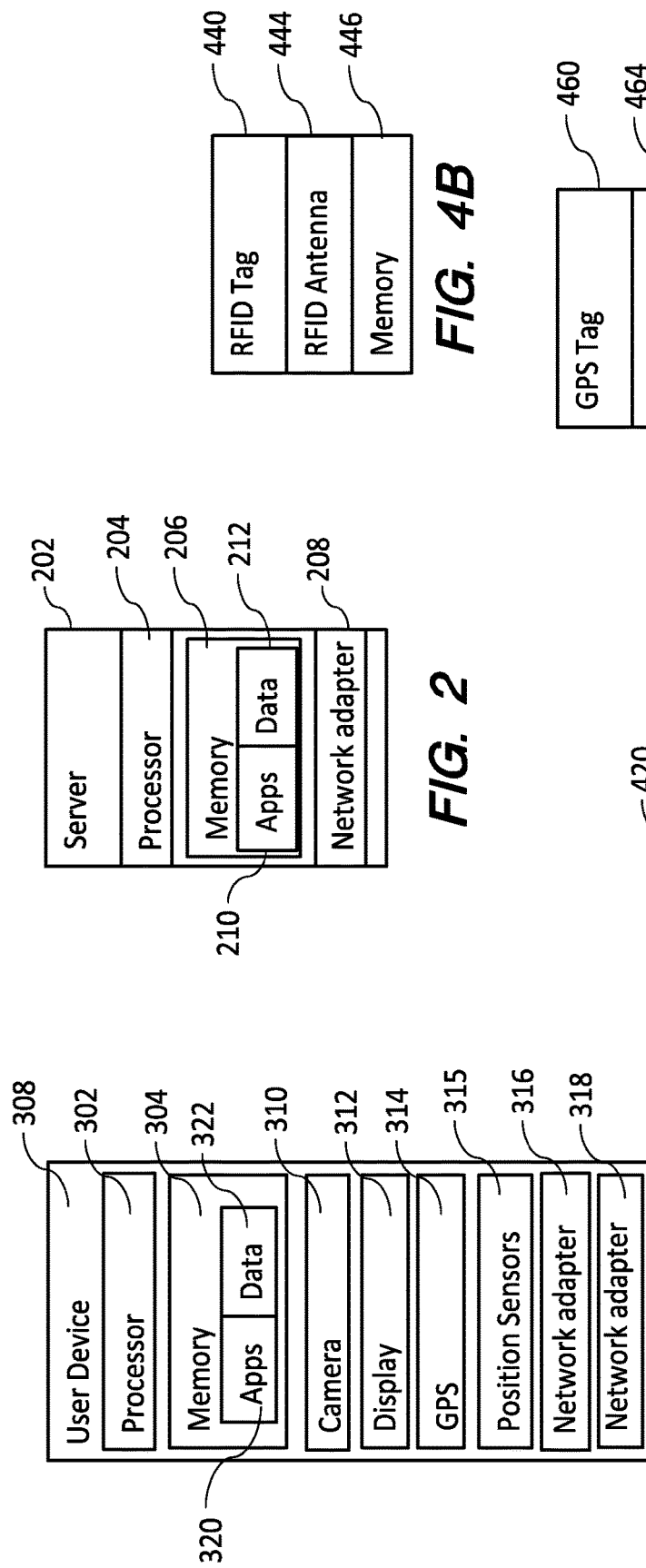
FIG. 2
FIG. 4A
FIG. 3

SYSTEMS AND METHODS FOR USING AUGMENTED REALITY TO LOCATE OBJECTS, IDENTIFY PERSONS, AND INTERACT WITH INANIMATE OBJECTS

CROSS-REFERENCE TO RELATED APPLICATIONS

This application is a continuation of U.S. Non-provisional application Ser. No. 16/825,733 filed on Mar. 20, 2020, which is a continuation-in-part of U.S. Non-Provisional patent application Ser. No. 16/514,048 filed on Jul. 17, 2019, now U.S. Pat. No. 10,598,507, which claimed the benefit of U.S. Provisional Application Ser. No. 62/772,205, filed on Nov. 28, 2018, all of which are incorporated herein by reference.

TECHNICAL FIELD

The field of the invention broadly relates to augmented reality. More specifically, the field of the invention relates to systems, methods, and processes, which authenticate ownership through the use of visual identification, and which further allow for interaction with otherwise inanimate objects via the use of a code thereon.

BACKGROUND

In many situations, tracking of physical objects and positive identification of an owner are useful. For example, in the context of air travel, luggage is many times separated from its owner intentionally or unintentionally creating the need to locate it. Locating lost luggage is hampered by the differing and labyrinthine systems used by airports generally to transport luggage and the now standard size and shape of luggage required by major air carriers. Once located, identifying lost luggage among a myriad of "look-a-like" bags can also create the problem of misidentification, even if the general location of luggage has been identified.

In the context of a warehouse, similar problems arise. For example, internet commerce has provided fulfillment companies that are tasked with the responsibility of moving countless shipping packages in standardized shipping boxes through complex routing systems to arrive at local carriers for delivery. Despite barcoding, many packages are misrouted and require physical tracking to be located which creates system inefficiencies, increased shipping costs and shipping delays.

There is also a need to positively identify physical objects in a variety of physical locations. For example, in an airport, there are many barriers to the use of known tracking devices. In general, GPS tracking of physical objects is difficult to accomplish inside concrete and steel buildings, thereby rendering it mostly ineffective in an airport terminal. In much the same way, large scale use of RFID tracking alone is ineffective because of radio interference of steel structures, such as baggage claim carousels and steel security barriers. Further, blueprinting an entire building may impede large scale RFID tracking because of its expense and the time required.

In much the same way, GPS tracking and RFID tracking systems are rendered ineffective in a warehouse due to steel racks, conveyor tracks and moving robotic forklift systems.

There is a need to positively associate the owner and message of physical objects once they have been located to prevent mistaken identification and to verify the ownership claims made. The prior art has failed to provide a system whereby the ownership of baggage is certified beyond a physical paper tag with a number and bar code. Further, paper tags are often lost or disfigured, rendering them useless. Further, paper identification tags do little to thwart theft and cannot provide a positive identification of luggage if the matching identification cards are lost.

In the same way, in a warehouse, positive identification of shipping packages cannot be made in the prior art without the use of paper labels and bar codes. Even so, the paper labels require identification by a scanner and are subject to being damaged or disfigured rendering them useless.

Therefore, a need exists to overcome the limitations of prior art systems to locate physical objects inside concrete and steel buildings with large numbers of steel barriers.

A need also exists for a system that can reliably locate physical items and positively associate them with their owners without the use of fragile and ineffective paper tags.

In the prior art, many modern systems exist for tracking objects by use of radio frequency identifier (RFID) tags and global positioning systems. However, none of them satisfactorily address the needs in the industry.

For example, U.S. Pat. No. 9,664,510 to Nathan, et al. discloses a system and method of tracking objects by combining data obtained from multiple sensor types. However, Nathan does not employ a combination of tagging systems with image recognition, augmented reality, or with verified visual authentication of ownership.

U.S. Pat. No. 6,489,244 to August, et al. discloses tracking baggage using radio frequency (RF) tags. However, a combination of global positioning, RFID or beacon signals with image recognition, and augmented reality mapping is not disclosed.

U.S. Pat. No. 9,305,283 to Lauka, et al. discloses associating RF identifier (RFID) tags with barcodes using images. However, Lauka does not disclose a combination of global positioning data, beacon signals and/or RFID tags with image recognition and a display of user information associated with a tagged object.

U.S. Publication No. 2006/0256959 to Hymes discloses spatial addressing to identify the location of objects in a display. However, a combination of beacon signals with image recognition and global positioning is not disclosed.

U.S. Pat. No. 8,237,564 to Chang discloses visualizing locations of RFID tagged items. However, Chang does not disclose a combination of global positioning and beacon signals with image recognition nor does it disclose augmented reality in combination with user identification.

SUMMARY OF EXAMPLE EMBODIMENTS

In a preferred embodiment, a beacon tag provides a radio signal that is received by a first user device. The first user device sends location information to a server that identifies the beacon tag and the location of the first user device. The server then stores the location information and, when a second user device requests the location of the object, the server sends the location information from the first user device to the second user device. When the object is located, the second user device displays either a picture of the owner, and/or a picture of the object of value including showing relevant descriptive details of the object, so that ownership verification can be made.

In another preferred embodiment, a beacon tag broadcasts multiple radio signals that are in range of and received by a user device. After receiving the signals, the user device determines the location of the tag with respect to the location of the user device. The user device then calculates a direction vector and displays it on any augmented reality display to direct the user to the object.

In another preferred embodiment, a video of an object is created that includes several thousand images from different perspectives. The video is uploaded to the server. The server then generates an object recognition file using the video. The object recognition file is downloaded to the user device. An image recognition program compares the object recognition file to a live video feed from the camera of the user device. When the object is located, a marker is then displayed (e.g., on a screen or augmented reality device) that indicates the location of the object.

In another preferred embodiment, the system provides a plurality of user devices, a plurality of tags, and printed media attached to objects. Each of the user devices is in communication with each of the tags. However, each of the user devices is paired with one unique tag. In this embodiment, each of the user devices reports the location of the tag to which it is the nearest to a server. The server then tabulates the locations of all the user devices and all the tags. The server then correlates the locations of the tags to the identities of the user devices to which they are paired and reports the location of each tag to its paired user device using the location of the closest user device as an estimate of the location of the paired tags.

In another preferred embodiment, the system provides for identification of the objects by recognition of the printed media attached to the exterior of the objects, and then displays a notification to a user via augmented reality (e.g., screen overlay on camera display of smartphone).

In another preferred embodiment, the system provides a plurality of modules including an RFID antenna, a receiver and a processor. The modules scan for RFID tags and when one is identified, the modules communicate their GPS location to the server. The proximity of the tag and the GPS location of the module is then communicated to the associated user device. In this embodiment, the RFID system is deployed in physical locations where it is advantageous as a supplemental location mechanism.

In another preferred embodiment, the system provides a plurality of user devices which each individually comprise a processor, a network adaptor and a GPS transponder. Each processor is programmed to periodically report its GPS location through the network adapter to the system server, which then, in turn, communicates the information to the user devices.

In another embodiment, a hybrid tag is provided which incorporates a beacon tag, an RFID tag and a GPS tag so that each of the systems may be used in combination.

In another embodiment a system is provided which utilizes beacon tags, RFID tags, and GPS tags in a hybrid system that receives location information from all the location tags to inform users of the locations of objects.

In another embodiment, the system provides immediate user feedback via augmented reality in association with the printed media, beacons, RFID tags, GPS tags, or other related actionary devices to visually display real-time location and tracking services with the visual display on the user's device with proof of ownership.

In one embodiment, an augmented reality system comprises a user device with augmented reality software and an augmented reality fingerprint marker positioned on an object, such as a credit card, check, or other financial item, etc. As used herein, an "augmented reality fingerprint marker" means a unique code, symbol, or other identifier that is scannable by a user device to activate an augmented reality. The user device may be a smartphone, computer, tablet, glasses, or any device that is capable of performing augmented reality. The user device and the augmented reality software maps the environment and reads the augmented reality fingerprint marker, which superimposes digital information received from the augmented reality fingerprint marker over the real-world objects displayed on the user's device. For example, a user, such as a store clerk, could take a customer's credit card during the check-out process and scan the credit card with the user device, which could then superimpose digital information about the customer on the user device (i.e., augment reality), such as photo identification of the owner of the card or other relevant information.

In one embodiment, the object may be a pharmaceutical vial. The user device and the augmented reality software maps the environment and reads the augmented reality fingerprint marker on the pharmaceutical vial (or other pharmaceutical item), which superimposes digital information received from the augmented reality fingerprint marker over the pharmaceutical vial displayed on the user's device. This information may be patient verification information, such as a photo of the patient with name and birthdate, medication, dosage, doctor, or other information.

In one embodiment, the augmented reality fingerprint marker could be placed on a person's clothing or other belonging, on their personal file information (e.g., hospital file), or in any other location. This allows a third party to verify ownership of an item, or that the correct person is present. For example, if the marker is on clothing, the marker may be scanned, which would then identify the owner by name and photo (and other information, as determined by a user, such as phone number, etc.). In a hospital setting, a nurse may scan a patient's pharmaceutical prescription before dosing to ensure the medicine is being administered to the correct patient.

In one embodiment, the object may be a license plate. For example, the license plate may have an augmented reality fingerprint marker embedded therein, which, when scanned, displays information relating to the vehicle and driver.

In one embodiment, the object may be a pet. The augmented reality fingerprint marker may be placed on a pet's collar so that the pet may be identified through the user device. For example, a user may scan the augmented reality fingerprint marker on a pet, such as a dog, with the user device. The displayed information may include, but is not limited to, medications, allergies, and food type and brand, among others.

In one embodiment, an object may be a military ID or file. When military personnel have to enter a secured area, a user can obtain their identification and scan the augmented reality fingerprint marker located thereon, allowing the user to see information displayed about the military personnel on the user device.

In one embodiment, the object may include, but is not limited to, print media or digital media. For example, printed ads, such as newspapers, may include augmented reality markers, which, when scanned, superimpose media as selected by the advertiser. Further, digital ads, such as video ads, may also include augmented reality markers, allowing a user to scan and interact with the advertiser as selected by the advertiser. Such interactions may include prices, reviews, location, or additional information about the product, service, or business.

In one embodiment, the object may include, but is not limited to, headstones, in-wall internments, urns, etc. For example, a headstone may include an augmented reality marker, which, when scanned, can superimpose information about the deceased on a user device. Some of the information displayed on a user device may include a photo, biography, inspirational information, etc.

BRIEF DESCRIPTION OF THE DRAWINGS

The disclosed embodiments will be described with reference to the accompanying drawings.

FIG. 2 is a component architecture diagram of a server for tracking and locating objects.

FIG. 3 is a component architecture diagram of a user device for tracking and locating objects.

FIG. 4A is a component architecture diagram of a beacon tag for tracking and locating objects.

FIG. 4B is a component architectural of an RFID tag for tracking and locating objects.

FIG. 4C is a component architectural tag of a GPS tag for tracking and locating objects.

DETAILED DESCRIPTION OF EXAMPLE EMBODIMENTS

Figure 1A:
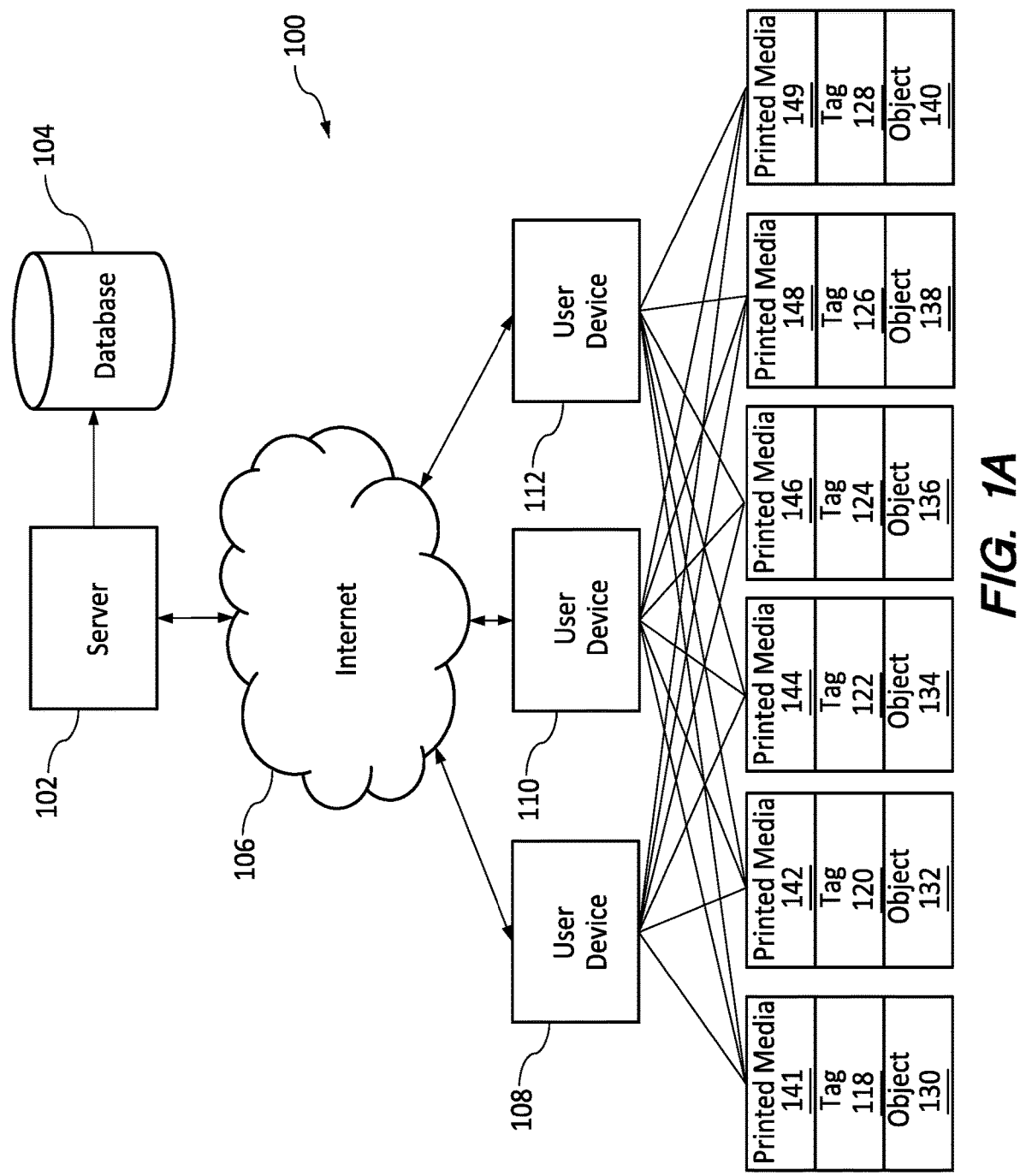
FIG. 1A is a system architecture diagram of a preferred embodiment of a system for tracking objects.

Aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a universal serial bus (USB) stick, a hard disk, a random access memory ("RAM"), a read-only memory ("ROM"), a flash memory, an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain or store a program for use by or in connection with an instruction, system, apparatus, or device. More specific examples of the computer readable storage medium include, but are not limited to, smart devices, phones, tablets, wearables, X-Code software platforms, or any suitable combination of the foregoing.

Computer program code for carrying out operations for aspects of the present disclosure may be written in any combination of one or more programming languages, including, but not limited to, an object oriented programming language such as Java, Scala, Smalltalk, Eiffel, JADE, Emerald, Objective-C, C++, C#, VB.NET, Python or the like, conventional procedural programming languages, such as the "C" programming language, Visual Basic, Fortran 2003, Perl, COBOL 2002, PHP, ABAP, dynamic programming languages such as Python, PHP, HTML, AJAX, Ruby and Groovy, or other programming languages such as X-Code. The program code may execute entirely or partially on one or more of the devices of the system.

Aspects of the present disclosure are described with reference to flowchart illustrations and/or block diagrams of methods, systems, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, or other devices to cause a series of operational steps to be performed or to produce a computer implemented process that implements the functions specified in the flowcharts.

Aspects of the present disclosure are described with reference to printed media. The term "printed media" means anything that can be printed including, but not limited to, photos, vector images, GIFs, JPEGS, PNGs, stickers, emojis, posters, pages, bar code, matrix bar code such as a quick response (QR) code, labels, and combinations thereof.

Referring to FIG. 1A, system 100 includes server 102, which is connected to database 104. Server 102 is connected to user devices 108, 110 and 112 through internet 106. User devices 108, 110 and 112 are also connected through a wireless network to tags 118, 120, 122, 124, 126 and 128. In a preferred embodiment, each tag is physically attached to one of objects 130, 132, 134, 136, 138 and 140. In this preferred embodiment, at least one tag is associated with each user device. It should be understood that FIG. 1A shows only examples and that the system includes a large number of user devices and a large number of tags. FIG. 1A shows that each user device communicates with all the tags. However, in one embodiment, each user device is uniquely associated with only one tag. For example, user device 108 is uniquely associated with tag 118, user device 110 is uniquely associated with tag 124, and user device 112 is uniquely associated with tag 126. In another preferred embodiment, each user device may be associated with more than one tag, or with more than one type of tag. In various preferred embodiments, the tags may be beacon tags, RFID tags, or GPS tags, and may incorporate printed media, as will be further described. In other embodiments, one or more of objects 130-140 includes identifying printed media 141, 142, 144, 146, 148, or 149 located on an exterior portion of the respective one or more of objects 130, 132, 134, 136, 138 or 140.

In a preferred embodiment, the connections between the tags and the user devices are direct wireless connections using the Bluetooth Low Energy standard and specification. In other preferred embodiments, these connections include repeaters, routers, switches, and access points that provide for extended range communication capability.

Internet 106 includes one or more land-based wire networks and all forms of wireless networks. The messages passed between server 102 and user devices 108 through 112 use one or more protocols including, but not limited to, transmission control protocol/internet protocol (TCP/IP), user datagram protocol (UDP), hypertext transfer protocol (HTTP), and HTTP secure (HTTPS).

In different embodiments, the objects may take the form of any physical item to be tracked including, but not limited to, shipping boxes, shipping pallets, shipping containers, trailers, vehicles, pieces of luggage, or any objects of value. The objects may have printed media attached, formed, stitched, or otherwise placed on the object exterior.

Figure 1B:
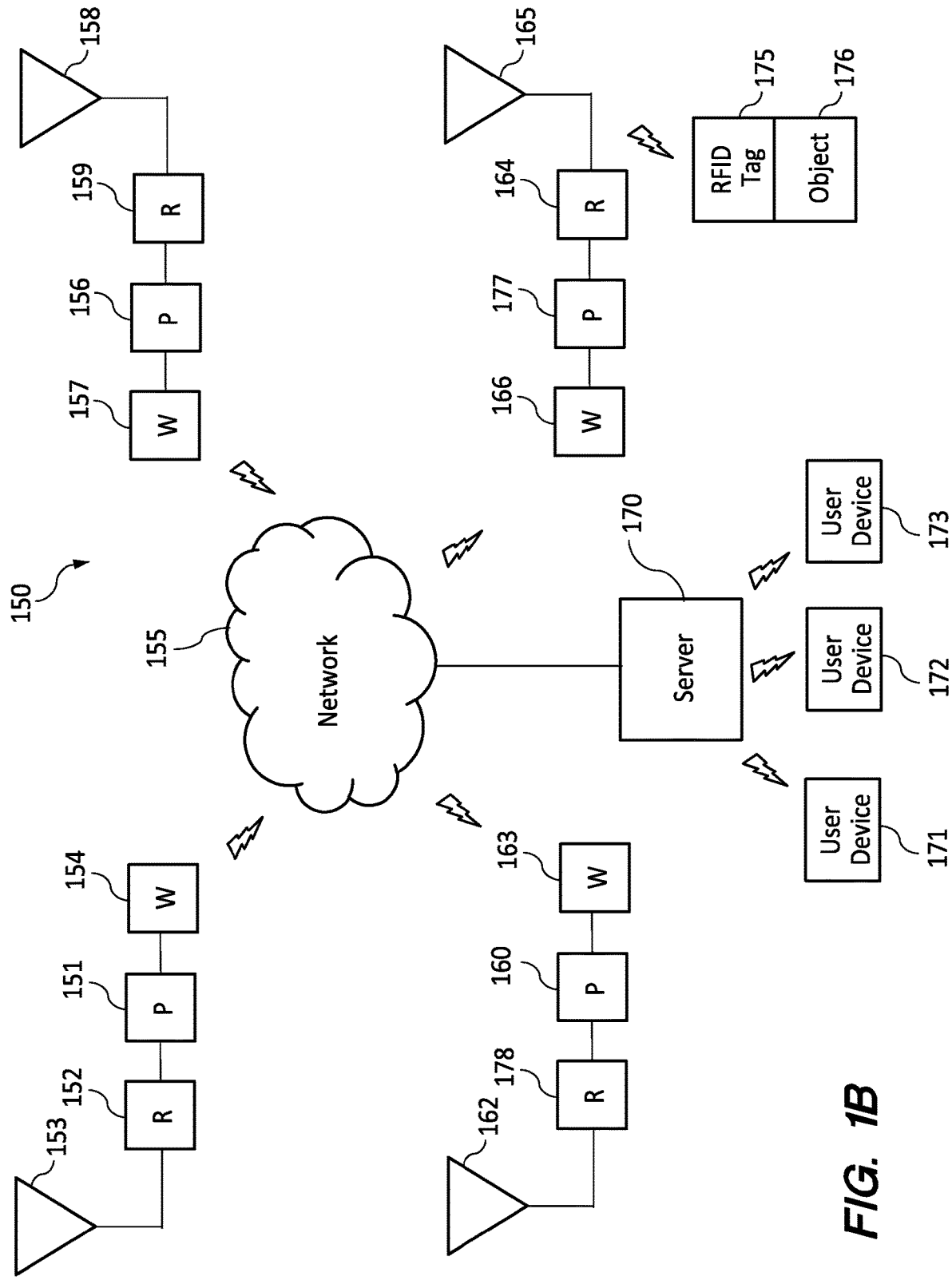
FIG. 1B is a system architecture diagram of a preferred embodiment of a supplemental system for tracking objects associated with an RFID tag.

Referring to FIG. 1B, a preferred embodiment of a system incorporating RFID tags is shown. System 150 includes processor 151 operatively connected to reader 152. Reader 152 is operatively connected to antenna 153. Processor 151 is also operatively connected to Wi-Fi interface 154. Wi-Fi interface 154 is wirelessly connected to internet 155. System 150 includes processor 156 operatively connected to reader 159. Reader 159 is operatively connected to antenna 158. Processor 156 is also operatively connected to Wi-Fi interface 157. Wi-Fi interface 157 is wirelessly connected to internet 155. System 150 also includes processor 160 operatively connected to reader 178. Reader 178 is operatively connected to antenna 162. Processor 160 is also operatively connected to Wi-Fi interface 163. Wi-Fi interface 163 is wirelessly connected to internet 155. System 150 includes processor 177 operatively connected to reader 164. Reader 164 is operatively connected to antenna 165. Processor 177 is also operatively connected to Wi-Fi interface 166. Wi-Fi interface 166 is wirelessly connected to internet 155.

Internet 155 is connected to server 170. Server 170 is, in turn, wirelessly connected to user devices 171, 172 and 173. The system includes exemplary RFID tag 175 physically attached to object 176. In this exemplary figure, RFID tag 175 is shown positioned next to and in communication with antenna 165. However, in a preferred embodiment, the system includes a plurality of RFID tags which are mobile and so can be positioned in proximity to any one or more of antennas 153, 158, 162 and or 165.

In a preferred embodiment, each processor, reader, Wi-Fi interface and antenna are contained in a single antenna base module. The system comprises a plurality of modules located at places where objects are likely to pass or be deposited such as luggage or shipping container transport conveyors, racks, turnstiles and storage bins.

In a preferred embodiment, each processor 151, 156, 160 and 177 includes a Raspberry Pi 3, Model B ARM Version 8, product number 3055 available from Adafruit. In a preferred embodiment, each reader is a 2.4 GHz active RFID reader product ID 800025 including data buffering available from GAO RFID, Inc. of Ontario, Canada. In a preferred embodiment, each reader includes a 2.45 GHz active personal RFID card tag, product ID 127002 which provides a range of 100 meters and is available from GAO RFID, Inc. of Ontario, Canada. In another embodiment, the reader includes, but is not limited to, a mobile device, a smart phone, a tablet, a wearable device, an X-Code software platform, or any suitable combination of the foregoing.

Figure 1C:
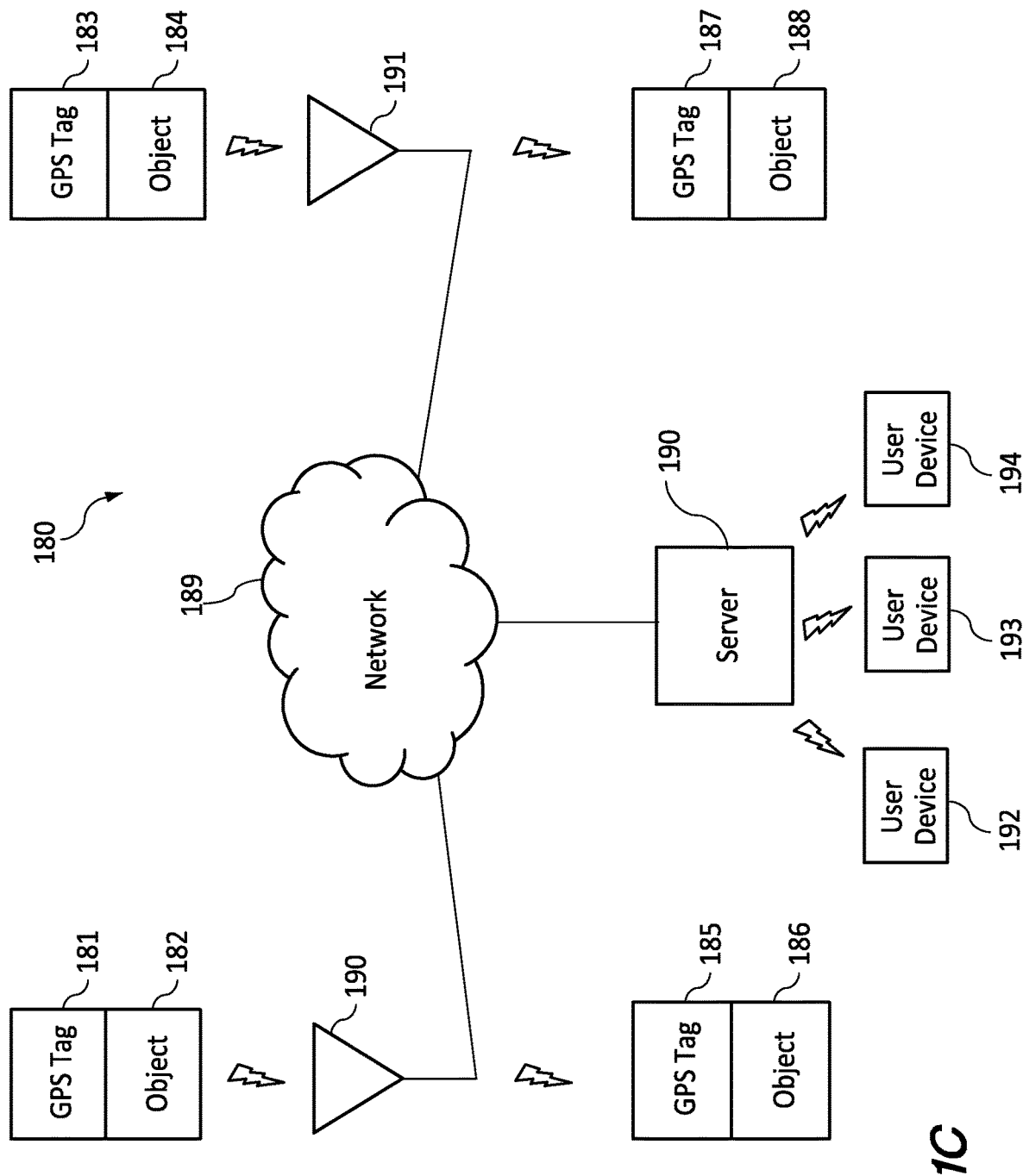
FIG. 1C is a system architecture diagram of a preferred embodiment of a supplemental system for tracking objects associated with a GPS tag.

Referring to FIG. 1C, a preferred embodiment of a system incorporating location tags is shown. System 180 includes GPS tag 181 physically attached to object 182. Likewise, the system includes GPS tag 183 physically connected to object 184, GPS tag 185 physically connected to object 186, and GPS tag 187 physically connect to object 188. Another preferred embodiment, of course, there can be many GPS tags connected to different objects at many different locations. In each case, this disclosure envisions that the GPS tags and objects will be moveable and will be physically incorporated into objects such as luggage or shipping containers.

System 180 further includes network 189. A preferred embodiment, network 189 is the internet. System 180 further comprises telephone networks 190 and 191 in operative communication with the internet. In a preferred embodiment, these telephone networks are cellular networks. Network 189 is connected to server 190 which is in turn wirelessly connected to user devices 192, 193, and 194.

Referring to FIG. 2, exemplary server 202 includes processor 204, memory 206, and network adapter 208. Server 202 communicates with the user devices and the database through network adapter 208. In a preferred embodiment, applications 210 and data 212 in memory 204, include a web server that is accessed by the user devices. Server 202 operates with database 104 (FIG. 1A) to store, generate, and process location and identification information received about the location tags from the user devices and from the location tags themselves.

Referring to FIG. 3, exemplary user device 308 includes processor 302 operatively connected to memory 304, camera 310, display 312, global positioning system transceiver 314, positioning sensors 315, and network adapters 316 and 318. Exemplary user device 308 communicates with the server utilizing network adapter 316 and receives the beacon signal broadcast messages from one or more tags with network adapter 318. Memory 304 includes apps 320 and data 322. In preferred embodiments, the exemplary user device 308 include, but are not limited to, smart phones, tablet computers, notebook computers, laptop computers, and desktop computers.

Exemplary user device 308 generates location information using global positioning system 314. The location information includes longitude, latitude, and altitude information for the location of the user devices. Positioning sensors 315 include accelerometers, gyroscopes, and magnetometers in a nine-axis sensor (three axes for the accelerometers, three axes for the gyroscopes, and three axes for the magnetometers) that allows the device to register relative changes in position and orientation fairly accurately and report them to the processor.

Network adapter 316 is a medium or long-range wireless network adapter, such as a mobile network adapter used with cellular communications technology, without limitation. Network adapter 318 is a short-range wireless network adapter that uses protocols such as Wi-Fi and Bluetooth, without limitation. Network adapter 316 is used to request information from and provide information to the server.

Short-range network adapter 318 receives beacon signal broadcasts from one or more beacon tags. The broadcast signals are used by the user device to identify instructions stored in memory and to execute them when required.

Referring to FIG. 4A, a preferred embodiment of a location tag will be described. Beacon tag 420 includes processor 404, memory 406, and network adapter 408. Memory 406 includes apps 410 and data 412. In a preferred embodiment, beacon tag 420 includes, but is not limited to, a Blue Giga BLE112 Bluetooth low energy single mode module, available from Digi-Key (www.digikey.com/product-detail/en/BLE112-A-V1/1446-1017-1-ND). Beacon tag 420 includes short-range wireless transceiver 414, that is used by the user devices to locate beacon tags. The transceiver transmits a beacon signal using a short-range wireless protocol and standard, examples of which include, but are not limited to, the Bluetooth Low Energy (BLE) beacon standard, Apple iBeacon, Google Eddystone, and AltBeacon. Each of the beacon tags is capable of transmitting a beacon signal periodically. In a preferred embodiment, the time period between signals can range from about 20 milliseconds to about 10 seconds, and in a preferred embodiment is about 200 milliseconds. The beacon signal includes a numeric code that uniquely identifies each individual beacon tag.

Referring then to FIG. 4B, an alternate embodiment of a location tag will be described. RFID tag 440 includes RFID antenna 444 and memory 446. In a preferred embodiment a serial number of RFID tag 440 is included in memory 446 and is returned when an activation signal is received from RFID antenna 444. In a preferred embodiment, the location tag includes a 2.45 GHz active personal RFID card tag, product ID 127002 which provides a range of 100 meters and is available from GAO RFID, Inc. of Ontario, Canada.

Referring then to FIG. 4C, an alternate preferred embodiment of a location tag will be described. GPS tag 460 includes processor 464 operatively connected to memory 466. Memory 466 includes program code 470 and data 472 which are used to boot up the processor and implement the functions of the device. Processor 464 is also operatively connected to cellular adaptor 468. Cellular adaptor 468 is used to communicate information to and from the processor in operation. The processor, memory and cellular adaptor are each powered by battery 474 which is subject to power use restriction from program code 470, during operation. In a preferred embodiment, processor 464 includes, but is not limited to, a Raspberry Pi 3, Model B, ARM Version 8, product number 3055 available from Adafruit. Memory 466, in a preferred embodiment, is a one gigabit RAM located on the Raspberry Pi 3 board. In a preferred embodiment, cellular adapter 468 is a particle electron cellular IOT adapter product number 3234 available from Adafruit. The cellular adapter is capable of 3G cellular connection with web access.

Each of the beacon tag, the RFID tag and/or the GPS tag, or any of them alone or together, can be combined in a single location tag, as will be further described.

Figure 4D:
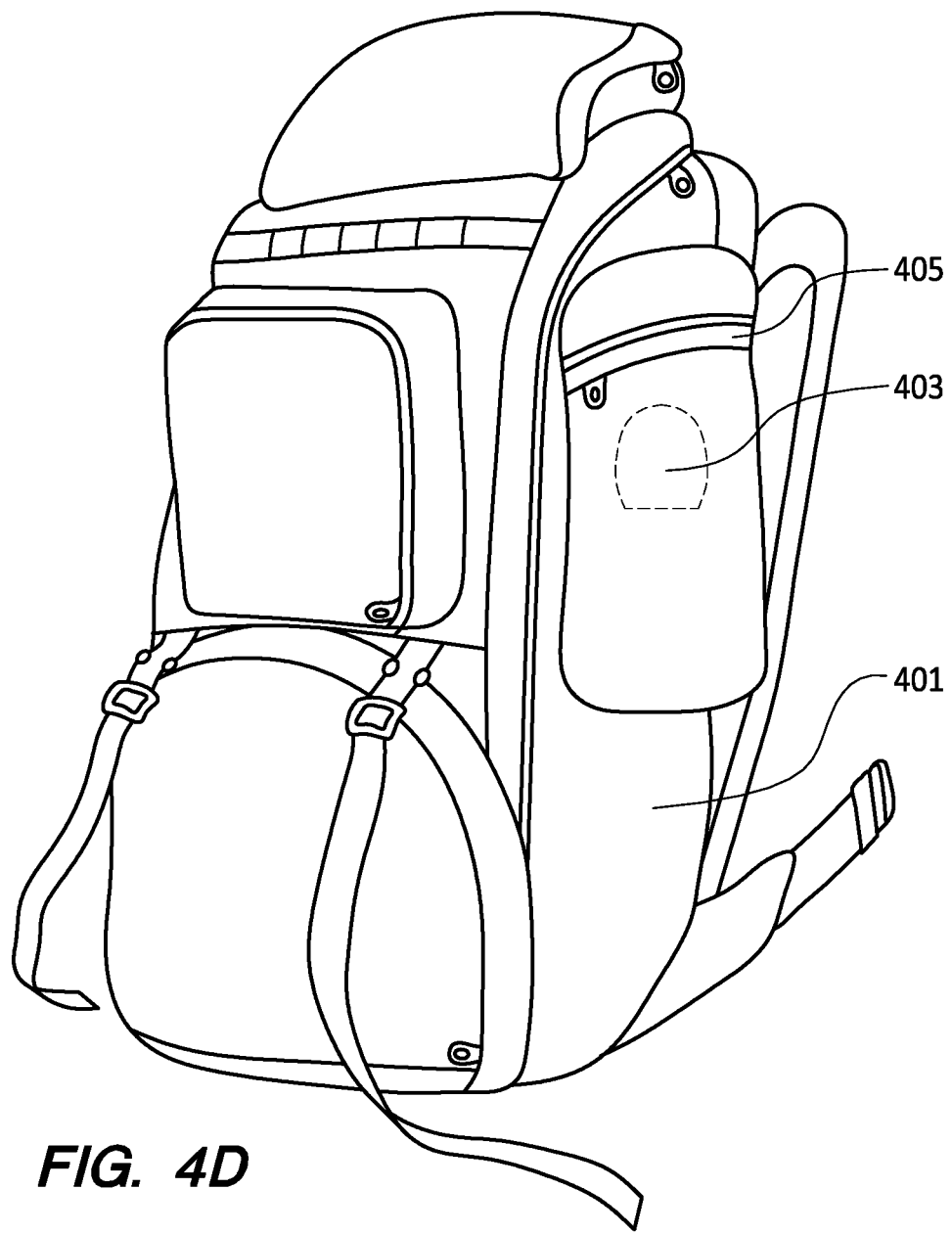
FIG. 4D is a drawing of a preferred embodiment of baggage to be tracked with a location tag.

FIG. 4D shows a preferred embodiment of a location tag 403 and an object to be tracked 401. In this embodiment the object to be tracked is luggage, such as a backpack. Location tag 403 is operatively disposed within pocket 405 so that it may be removed for charging or maintenance. Location tag 403 can be a beacon tag, an RFID tag or a GPS tag in different embodiments.

Figure 4E:
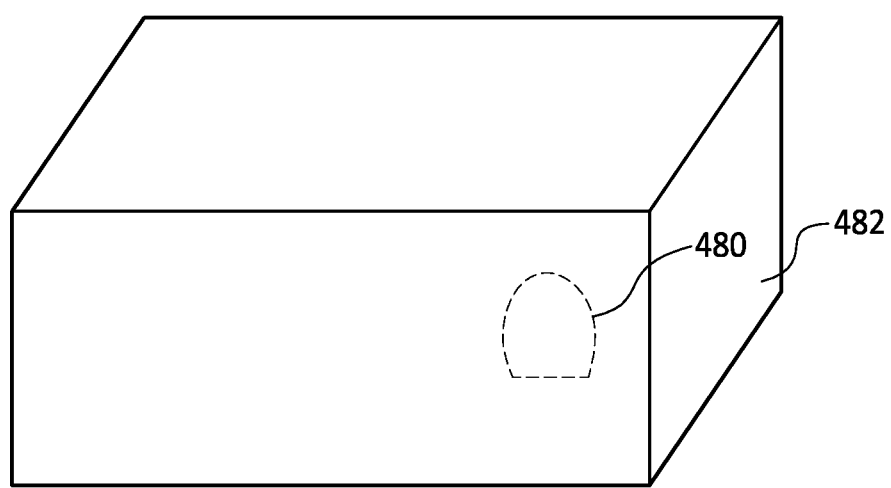
FIG. 4E is a drawing of a shipping package to be tracked with a location tag.

FIG. 4E shows a preferred embodiment of a location tag 480 and an object to be tracked 482. In this embodiment, the object to be tracked is a shipping package. Location tag 480 is operatively disposed within the package so that it is concealed from outside view and yet still free to operate through radio communications.

Figure 5A:
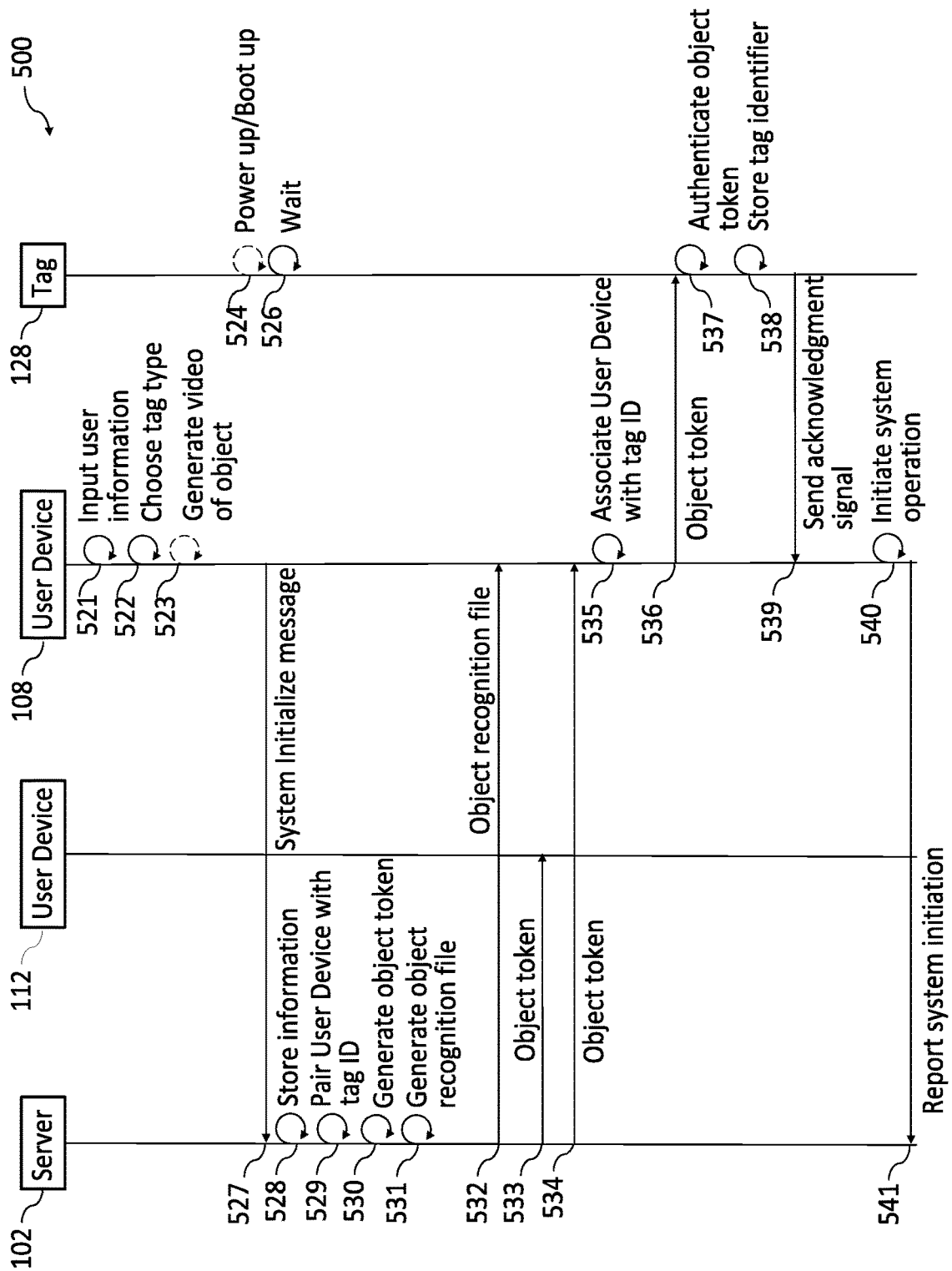
FIG. 5A is a sequence diagram of a routine to initialize a preferred embodiment of the system.

FIG. 5A shows method 500, which initializes various files and subsystems to enable a preferred embodiment of the system. At step 521, a user device is used to input personal identification information such as a user name, address, fingerprint, picture, and trip identifier. An example of a "trip identifier" can include a flight number, a flight time, a departure location and a destination location. This information is stored in memory. Optionally, at step 522 a location tag type is chosen, including a beacon type, an RFID type and/or a GPS type.

Optionally, at step 523, the camera of the user device is directed toward the object with which the tag is associated and initiates recording of an image recognition training video. The image recognition training video is a series of video frames used to train or teach image recognition software to identify the object. Each frame of the video includes an image of the object. In a preferred embodiment, the camera provides images of the object from different angles. In a preferred embodiment, the image recognition training video provides images at 30 frames per second for about 30 seconds, which provides about 900 separate images of the object. In other embodiments, the image recognition training video provides images at any video frame rate useful for image recognition. In a preferred embodiment, the image recognition training video is generated only when the system is first initialized.

Optionally, at step 524, if the location tag type is either a beacon tag or a GPS tag, then the tag is powered up. Optional step 524 may include booting up a beacon tag or a GPS tag. At step 526, the tag enters a wait state.

At step 527, user device 108 sends a "system initialize message," to server 102. The message includes the personal identification information, the tag type, the image recognition training video, a user device identifier, or serial number.

At step 528, the personal identification information, the tag type, the image recognition training video, and the user device identifier are stored in memory.

At step 529, the server associates or "pairs" user device 108 with tag 128 and registers the association in memory. The association is used by the system to notify the user device when the tag is located. In a preferred embodiment, the memory is organized into a database format capable of storing and accessing thousands of sets of user information (or more) and associated location tags.

At step 530, server 102 generates an object token. The object token includes a tag identifier. In one preferred embodiment, the tag identifier is a unique serial number that is stored in 4 bytes. In another preferred embodiment, the object token is formed by hashing the tag identifier and a random number. The random number is associated with the tag identifier and is stored in the database for later use.

Optionally, at step 531, server 102 generates an object recognition file. The object recognition file identifies the configuration, topology, and weights used by an image recognition algorithm to identify the object, as will be further described.

At step 532, server 102 sends the object recognition file to user device 108. User device 108, in this example, is associated (or paired) with tag 128. The object recognition file allows user device 108 to recognize and identify the object when it appears in an image captured by the camera of user device 108, as will be further described.

At step 533, server sends the object token and the random number to user device 112. User device 112, in this example, is not associated (or paired) with tag 128.

At step 534, server 102 sends the object token and the random number to user device 108.

At step 535, user device 108 is associated with the tag identifier, so that the user device will recognize the tag identifier as the object associated with user device 108.

Optionally, if the tag is GPS type or beacon type, then at step 536, the object token and the random number are sent by user device 108 to tag 128.

Optionally, if the tag is GPS type or beacon type, then at step 537, the object token is authenticated by tag 128. Tag 128 authenticates the object token by decrypting it, using the random number to access the tag identifier. The tag identifier is compared with the tag identifier stored in the tag memory. If the tag identifiers match then the tag activates itself. If the tag identifiers do not match then the tag shuts down.

Optionally, if the tag is GPS type or beacon type, then at step 538, the tag identifier is stored in memory by tag 128.

Optionally, if the tag is a GPS type or beacon type then, at step 539, the tag sends an acknowledgment signal to user device 108. At step 540, user device 108 initializes the system. At step 541, user device 108 reports system initialization to the server.

Figure 5B:
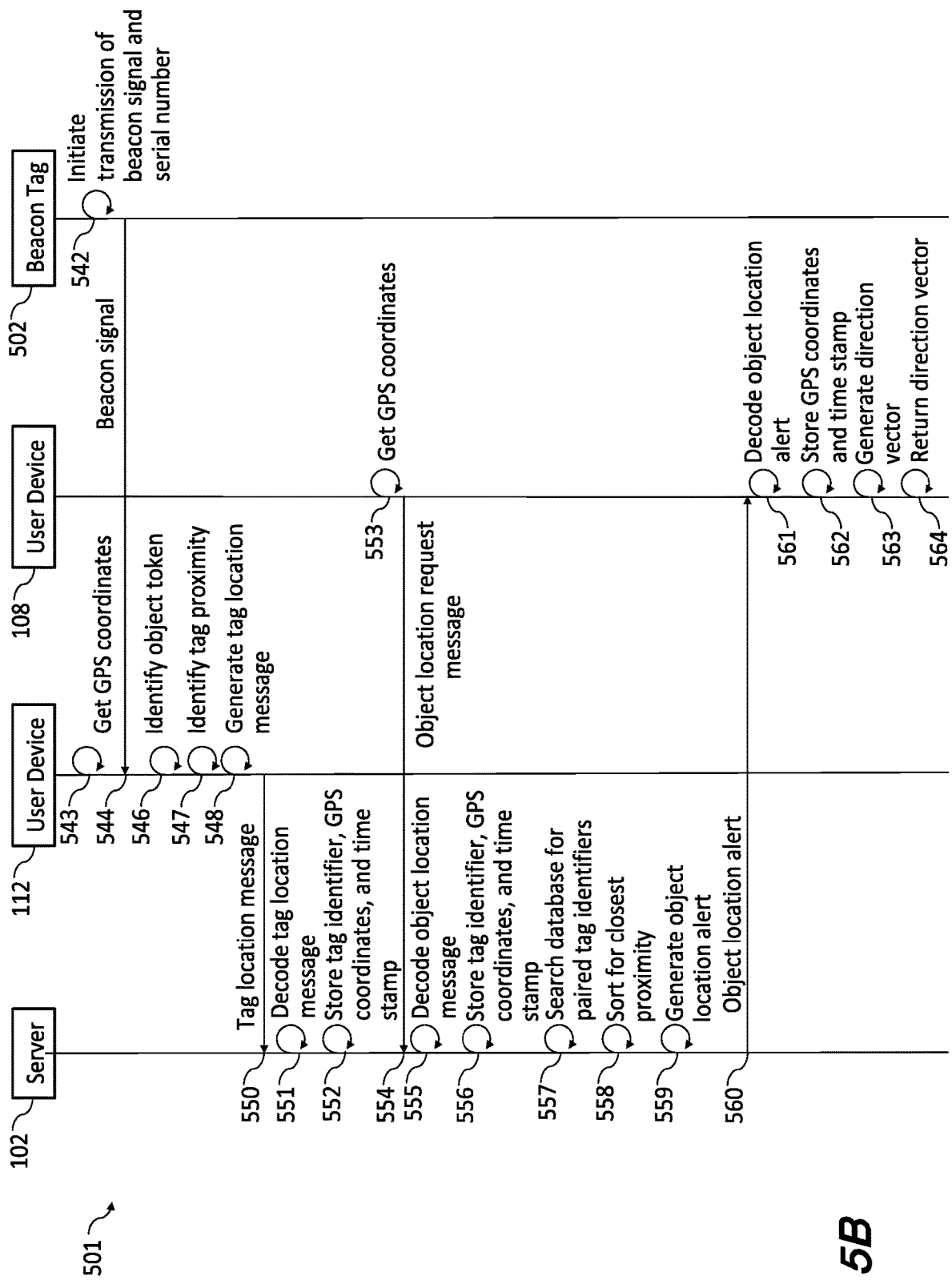
FIG. 5B is a sequence diagram of a preferred method in which a first user device identifies and reports the long-range location of a beacon tag that is associated with a second user device.

FIG. 5B shows method 501, which describes the system in use where a first user device identifies and reports the long-range location of a beacon tag that is associated with a second user device. In this example, user device 108 is paired with beacon tag 502. It is assumed that beacon tag 502 and user device 112 are both at a great distance from user device 108. It is assumed that beacon tag 502 and user device 108 are not in close proximity to each other. It is also assumed that user device 112 is at a short distance from beacon tag 502.

At step 542 the beacon tag 502 begins transmitting a beacon signal and its serial number or token. In a preferred embodiment, the beacon tag 502 is pre-set to send a signal once about every 200 milliseconds at a power level of about 50 mW. At step 543, user device 112 polls its onboard GPS transceiver to determine its GPS coordinates. In a preferred embodiment, the GPS coordinates are updated about once every minute.

At step 544, beacon tag 502 sends the beacon signal to user device 112. At step 546, user device 112 records a time stamp and then processes the beacon signal to decode the object token to determine the tag identifier.

At step 547, user device 112 measures the strength of the beacon signal and consults a predetermined calibration table to translate the strength into a range of distances that approximates the distance from the tag to user device 112. In a preferred embodiment the following table is used:

TABLE 1

| Signal Strength | Estimated Tag Distance |
| --- | --- |
| 0.98-0.85 mW | 25-30 ft |
| 1.13-0.98 mW | 20-25 ft |
| 1.30-1.13 mW | 15-20 ft |
| 1.50-1.30 mW | 10-15 ft |
| 1.73-1.50 mW | 5-10 ft |
| 1.94-1.73 mW | 1-5 ft |
| >1.94 mW | <1 ft |

At step 548, user device 112 generates a "tag location message" that includes its user device identifier, the tag identifier, the range of distances, the GPS coordinates of user device 112 and the time stamp showing when the beacon signal was received. It should be understood that in a preferred embodiment, many tag location messages will commonly be generated by a plurality of user devices, such as user device 112, each being reported back to the server.

At step 550, user device 112 sends the tag location message to the server.

At step 551, the server decrypts the tag location message (if encrypted) using the random number associated with the tag to identify the tag identifier. At step 552, the tag identifier, the GPS coordinates of user device 112, the time stamp, and the random number associated with the tag identifier are then stored in the database.

At step 553, user device 108 detects and stores its GPS coordinates. At step 554, an object location request message is sent from user device 108 to server 102. The object location request includes the device identifier for user device 108 and the GPS coordinates of user device 108.

At step 555, the server decrypts the object location message using the random number or serial number associated with the user device (if encrypted). At step 556, the information is stored in the database. At step 557, the server retrieves all tag location messages from the database and then compares them to the tag identifier to locate those messages which match the tag identifier for beacon tag 502. These are "matched tag identifiers." At step 558, the server sorts the matched tag identifiers to determine the GPS coordinates of the user device that is closest to the beacon tag.

At step 559, an "object location alert" is generated by server 102. The object location alert includes the GPS coordinates of user device 112 (or the closest set of GPS coordinates reported) and the associated time stamp.

At step 560, the object location alert is transmitted from server 102 to user device 108.

At step 561, user device 108 decodes the object location alert. At step 562, the GPS coordinates of user device 112 (or the closest set of coordinates) located in the object location alert are stored in memory.

At step 563, a direction vector is generated by user device 108. In this embodiment, the direction vector is taken as positive from the location of user device 108 to the location of user device 112. The angle of the direction vector is taken as positive clockwise from true north as 0°. The magnitude of the direction vector is taken in feet positive from the location of user device 108 to the location of user device 112. At step 564, the direction vector is returned for further processing.

Figure 5C:
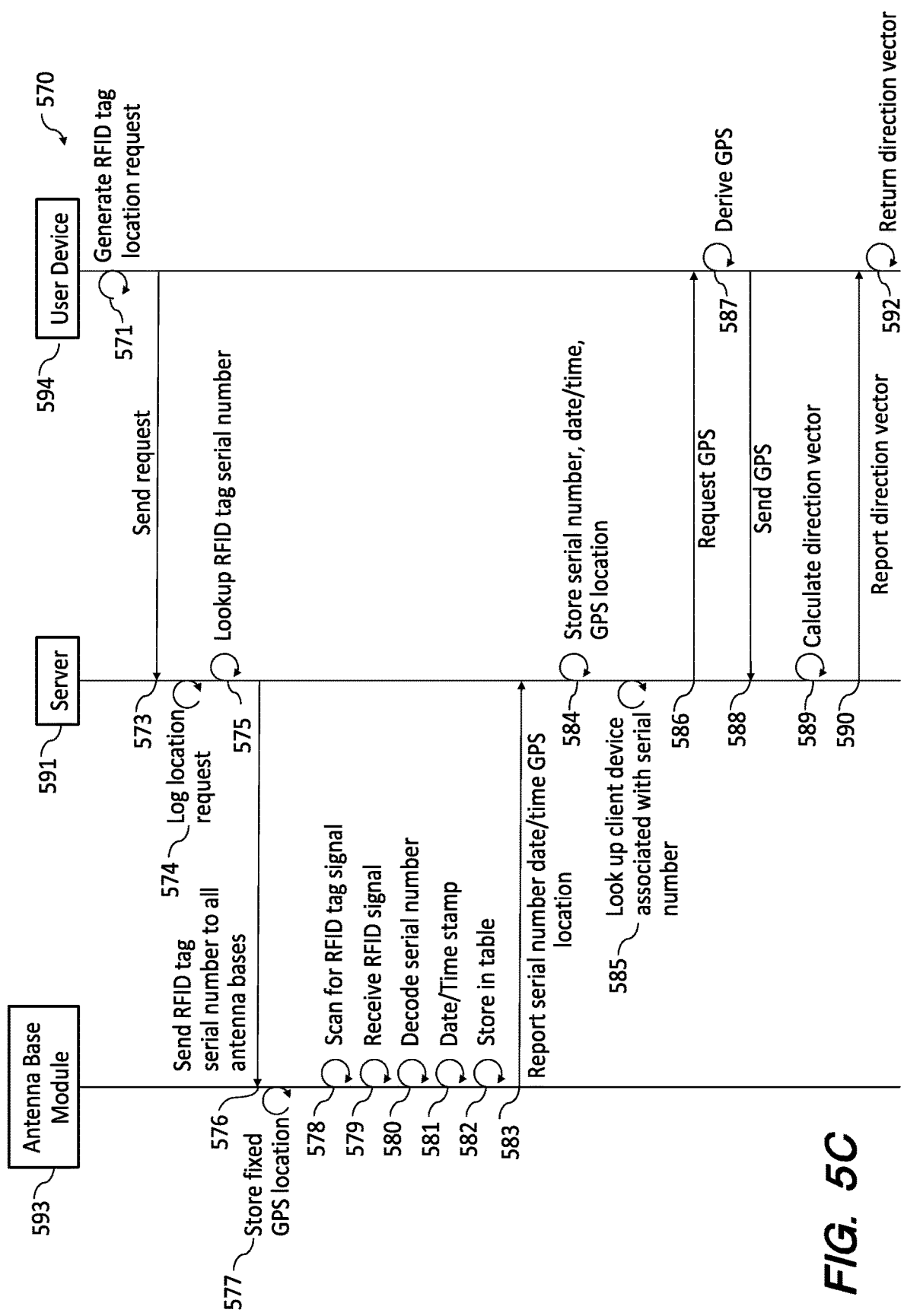
FIG. 5C is a sequence diagram of a preferred embodiment which reports the location of an object fitted with an RFID tag.

Referring to FIG. 5C, a method 570 of determining an RFID tag location will be described.

At step 571, user device 594 generates an RFID tag location request. The RFID tag location request includes the serial number of the user device. At step 573, the RFID tag location request is sent to server 591. At step 574, the server logs the request location and the serial number of the user device. At step 575, the server consults a lookup table which includes a list of all user devices and associated RFID tag serial numbers. The RFID tag serial number associated with the user device serial number is identified. At step 576, the server sends a scan request to all antenna base modules in the system, including antenna base module 593, which includes the RFID tag serial number.

At step 578, antenna base module 593 stores its fixed GPS location. At step 578 the antenna based module begins a scanning loop in which the antenna is repeatedly polled for the presence of an RFID tag signal. At step 579, antenna base module 593 receives an RFID signal. At step 580, the antenna base module decodes the serial number from the RFID signal. At step 581, the antenna base module records a date and time stamp at which the RFID signal was received. At step 582, the serial number and date/time stamp are stored in a table in onboard memory. At step 583, the antenna base processor utilizes an onboard wifi network adaptor to report the serial number, date/time stamp and GPS location to server 591.

At step 584, server 591 stores the serial number date/stamp and GPS location of the antenna base module. At optional step 585, server 591 consults a look up table for the client device or fixed coordinates that are associated with the serial number. At step 586, server 591 sends a request for GPS coordinates to user device 594. At step 587, user device 594 derives its GPS coordinates from the onboard GPS transceiver. At step 588, user device 594 sends the derived GPS coordinates to server 591. At step 530, server 589 calculates a direction vector. In this embodiment, the direction vector is directed from the GPS location of the user device 594 to the GPS location of the antenna base module 593. In this embodiment, the direction of the direction vector is taken as the number of degrees from true north. The magnitude is taken as positive from the location of the user device to the location of the antenna base module. The magnitude of the vector is reported in feet. At step 590, server 591 reports the direction vector to user device 594. At step 592, the user device returns the direction vector and the process concludes.

Figure 5D:
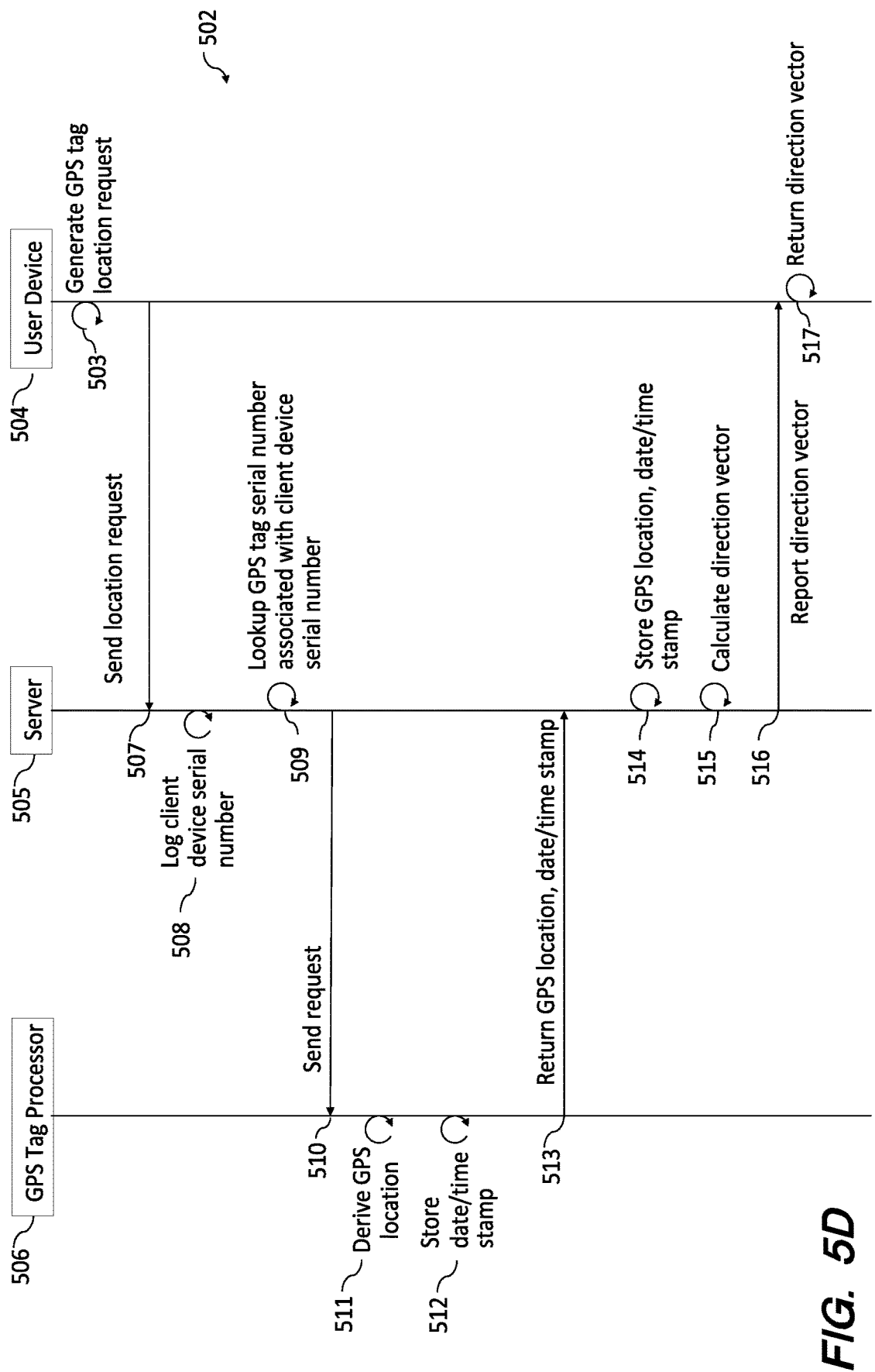
FIG. 5D is a sequence diagram of a preferred embodiment which reports the location of an object fitted with a GPS tag.

Referring then to FIG. 5D, a preferred method 502 of reporting GPS tag location will be further described. At step 503, user device 504 generates a GPS tag location request. In a preferred embodiment, the request includes the GPS coordinates of the user device, a 4-byte request code and the serial number of the user device. At step 507, user device 504 sends the location request to server 507. At step 508, server 505 decodes the location request and logs the user device serial number and its GPS coordinates. At step 509, server 505 consults a lookup table to determine the GPS tag serial number associated with the user device serial number. At step 510, server 505 sends a request to the associated GPS tag processor 506 for GPS tag location. At step 511, GPS tag processor 506 resolves its GPS location from the onboard GPS transceiver. At step 512, GPS tag processor 506 stores a date and time stamp associated with the GPS location and the location request. At step 513, GPS processor 506 returns the GPS location and the date and time stamp to server 505. At step 514, server 505 stores the GPS location and the date and time stamp.

At step 515, server 505 calculates a direction vector. In this embodiment the direction vector is the vector from the GPS location of the user device 504 to the GPS location of the GPS tag processor 506. The direction of the direction vector is taken as the number of degrees from true north. The magnitude is taken as positive from the location of the user device 504 to the location of the GPS tag processor 506. The magnitude of the vector is reported in feet. At step 516, server 505 reports the magnitude and direction of the direction vector to user device 504. At step 517, user device 504 returns the direction vector and the method concludes.

Figure 6A:
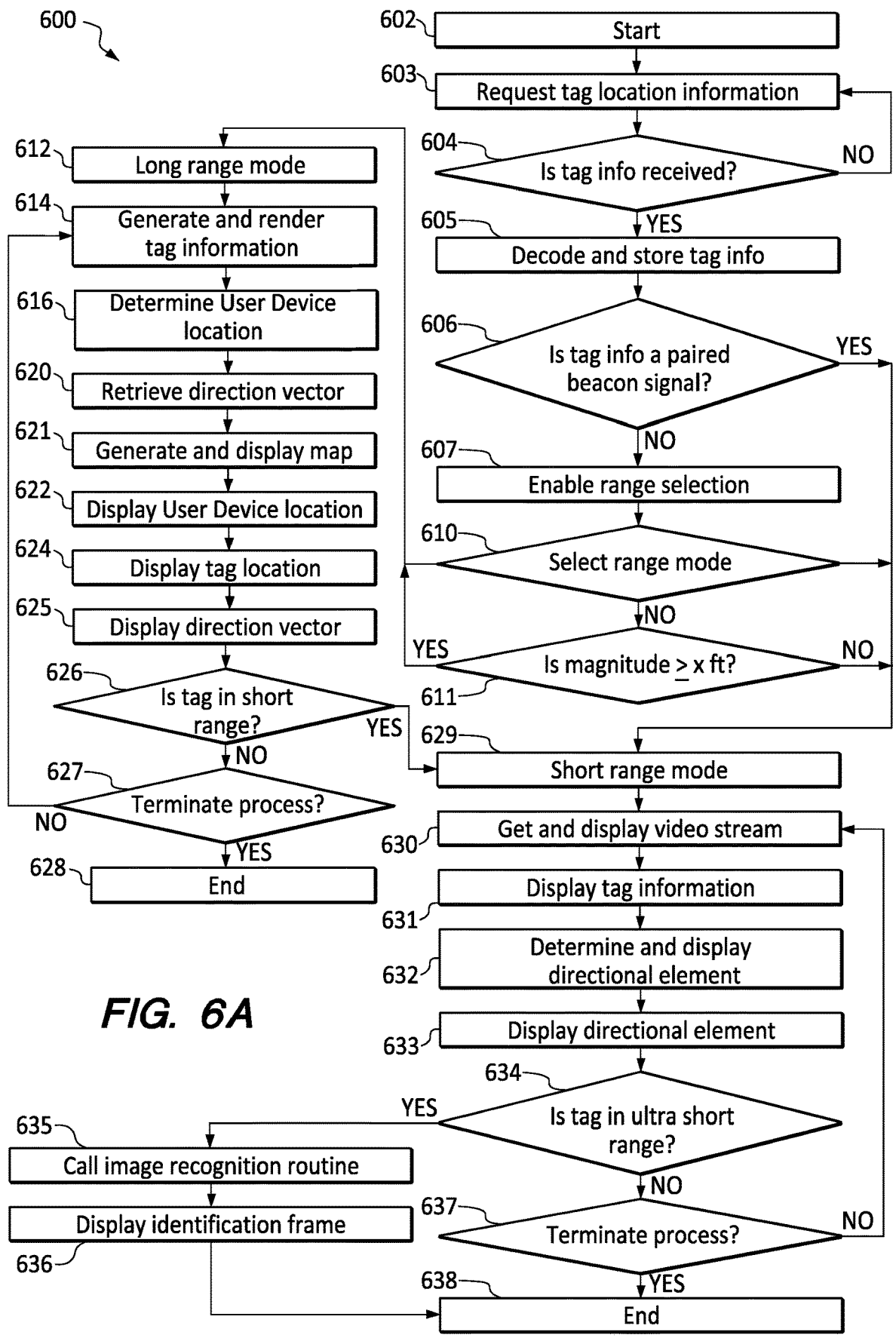
FIG. 6A is a flowchart of a preferred method for tracking a beacon tag, an RFID tag or a GPS tag in long-range mode, short-range mode and ultra-short-range mode.

Referring to FIG. 6A, a tag range determination tracking routine 600 operates on user device 108 to locate, identify, and display the location of an object which is physically attached to a beacon tag, and RFID tag and/or a GPS tag. The location tag will be responsive to the various systems described based on which of the functionalities, namely, beacon tags, RFID tags, GPS tags and/or printed media are included.

At step 602, the method starts.

At step 603, a request for tag location information is sent to server 102.

At step 604, a decision is made as to whether or not tag location information has been received. If so, the method proceeds to step 605. If not, the method returns to step 603. In one preferred embodiment, the tag location information is a direction vector. In another embodiment the tag location information is a beacon signal.

At step 605, the user device decodes and stores the tag location information. At step 606, a decision is made. If the tag information is a beacon signal from a beacon tag paired with a user device, then the method moves directly to short-range mode at step 629. If not, then the method continues to step 607. At step 607, a user interface is enabled, which allows a user to choose between "long-range mode" and "short-range mode." In long-range mode, the user device is presumed to be a relatively long distance from the tag. In short-range mode, the user device is presumed to be a relatively short distance from the tag. At step 610, the user device receives a selection of long-range mode or short-range mode or no decision. If the short-range mode is chosen, the method proceeds to step 629. If long-range mode is chosen, then the method proceeds to step 612. If no decision is received, then the method moves to step 611. At step 611, the magnitude of the direction vector is compared to a predetermined distance "x". In a preferred embodiment, x is between about 50 feet and 150 feet, but other distances can be chosen. In other embodiments, "long-range" can be up to hundreds of miles. If the magnitude of the direction vector is greater than x, then the method proceeds to step 612. If not, then the method proceeds to step 629.

At step 612, the user device enters long-range mode. In long-range mode, the direction vector may be generated by the long-range beacon tag system, the RFID tag system, the GPS tag system, or a combination of the three.

At step 614, the user device generates and displays a tag identifier, a trip identifier, a name and picture of the owner of the object, and an image of object 140.

At step 616, the user device determines its GPS location.

At step 620, the user device retrieves the direction vector from memory.

At step 621, the user device generates and displays a map section. In a preferred embodiment, the map section is downloaded from a third-party provider such as Google maps. The coordinates for the perimeter of the map section displayed are, in a preferred embodiment, scaled to approximately four times the length of the direction vector.

At step 622, the location of the user device is centered in the map section and displayed. In one preferred embodiment, the location of the user device is taken as the beginning point of the direction vector. In another preferred embodiment, the location of the user device is taken from the on-board GPS transceiver. In a preferred embodiment, the user device location is rendered using a specific recognizable icon.

At step 624, the tag location is rendered on the map. The location of the tag is taken as the end point of the direction vector. In a preferred embodiment, the tag location is represented as a different icon including, but not limited to, a diamond, arrow, emoji, text, or other geometric shape.

At step 625, the direction vector is displayed on the map.

Since it is assumed that the user device will be moving toward the location tag, and that the tag itself may be moving, it is necessary to frequently update the map and determine relative range. At step 626, the user device determines if it is in short-range. To do this, it compares the GPS coordinates of the user device to the GPS coordinates of the tag in the direction vector to arrive at a difference. The difference is then compared to a predetermined distance, such as about 100 feet. Other distances can suffice depending on the accuracy of the tag location desired. If the distance is smaller than the predetermined distance, then the method moves to step 629. If not, the method moves to step 627.

At step 627, the user device queries the user as to whether or not the process should terminate. If not, the method returns to step 614. If so, the method moves to step 628 and terminates.

Moving then to step 629, the user device enters "short-range mode." In a preferred embodiment, "short-range" is less than about 50 feet to about 150 feet, but other distances can be chosen so long as they are less than "long-range" mode. In short-range mode, the direction vector may be generated by the short-range beacon tag system, the RFID tag system, the object recognition system, or a combination of the three.

At step 630, a video stream from the camera of user device 108 is generated and displayed. A video stream is a sequence of static images generated by the camera of the user device.

At step 631, a tag identifier, a trip identifier, a name of the user of the user device, an image of the owner of the object and an image of the object are retrieved from memory and displayed.

At step 632, the process determines and displays the orientation of a directional element and updates the display, as will be further described. In a preferred embodiment, the directional element is displayed as either a "left direction arrow", a "right direction arrow", or a "bullseye". At step 633, the directional element is overlaid on top of the video stream and displayed. In a preferred embodiment, this step is repeated as long as the user device is moving.

At step 634, a determination of whether or not the tag is in "ultra-short" range. To do this the magnitude of the direction vectors are compared to a predetermined distance "y". In a preferred embodiment, y is between about 5 feet and 10 feet, but other distances may be chosen, so long as they are less than "short-range" mode. If the magnitude of the direction vector is less than y, then the method proceeds to step 635. If not, the method proceeds to step 637.

At step 635, the method calls an image recognition routine, to be further described.

At step 636, the method displays an identification frame, as will be further described. The method then proceeds to step 638 and terminates.

At step 637, the user is queried as to whether or not the process should terminate. If so, the process stops at step 638. In not, then the process returns to step 630.

Figure 6B:
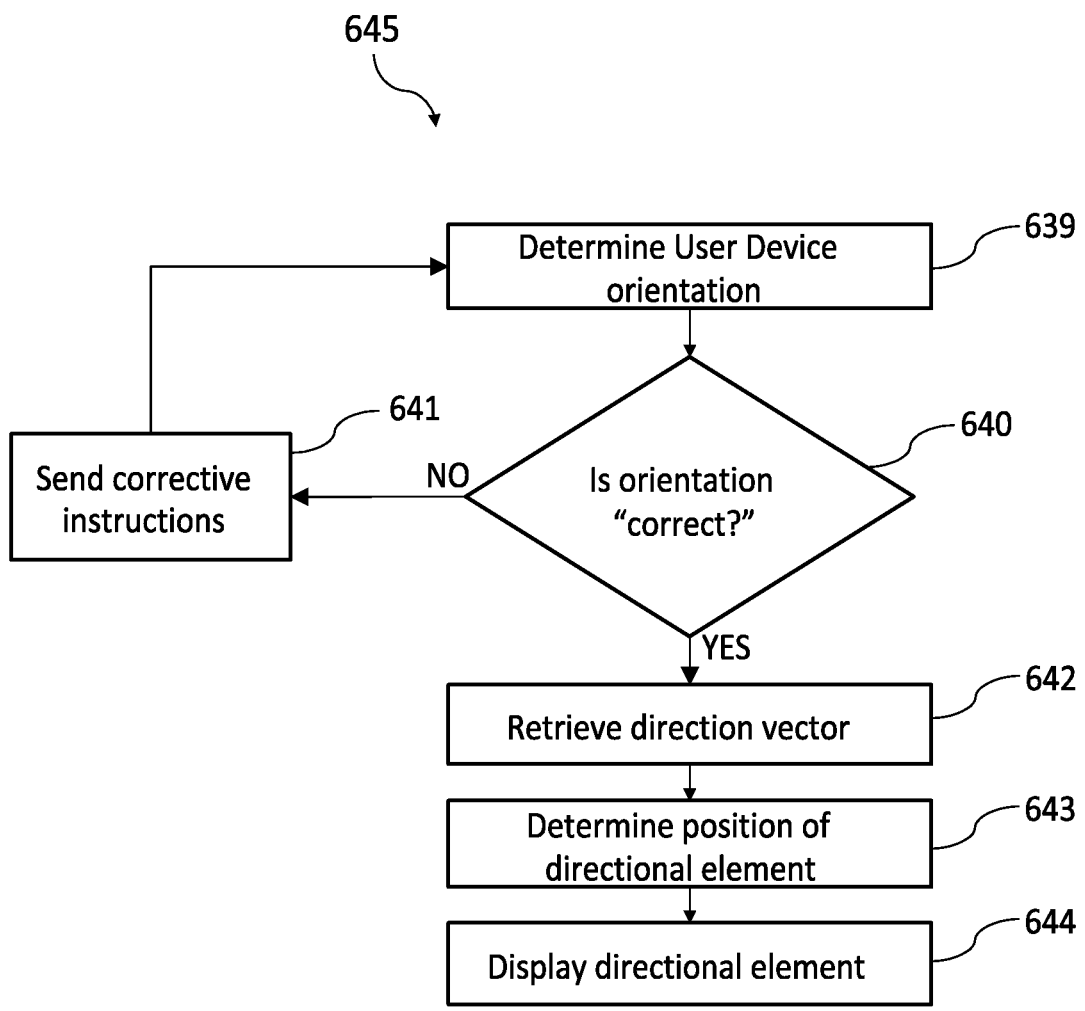
FIG. 6B is a flowchart of a method for calculating and displaying a directional element.

Turning to FIG. 6B, a preferred embodiment of a method 645 of determining and displaying a direction element will be described. At step 639, the position and orientation of the user device is determined. In a preferred embodiment, the user device polls its onboard position sensors to determine roll, pitch and yaw.

At step 640, the orientation of user device is checked to see if it is "correct." In this step, the current position of the user device is compared to an ideal position to determine a difference. If the user device orientation is "correct," then the method moves to step 642. If not, the method moves to step 641 and displays instructions to the user as to the correct orientation of the user device. The method then returns to step 639.

At step 642, the direction vector is retrieved from memory.

At step 643, the orientation of the display element is determined, as will be further described.

At step 644, the method generates and displays a directional element that directs the user to the tag location. This directional element may be displayed as superimposed on an augmented reality display (e.g., smart device).

Figure 6C:
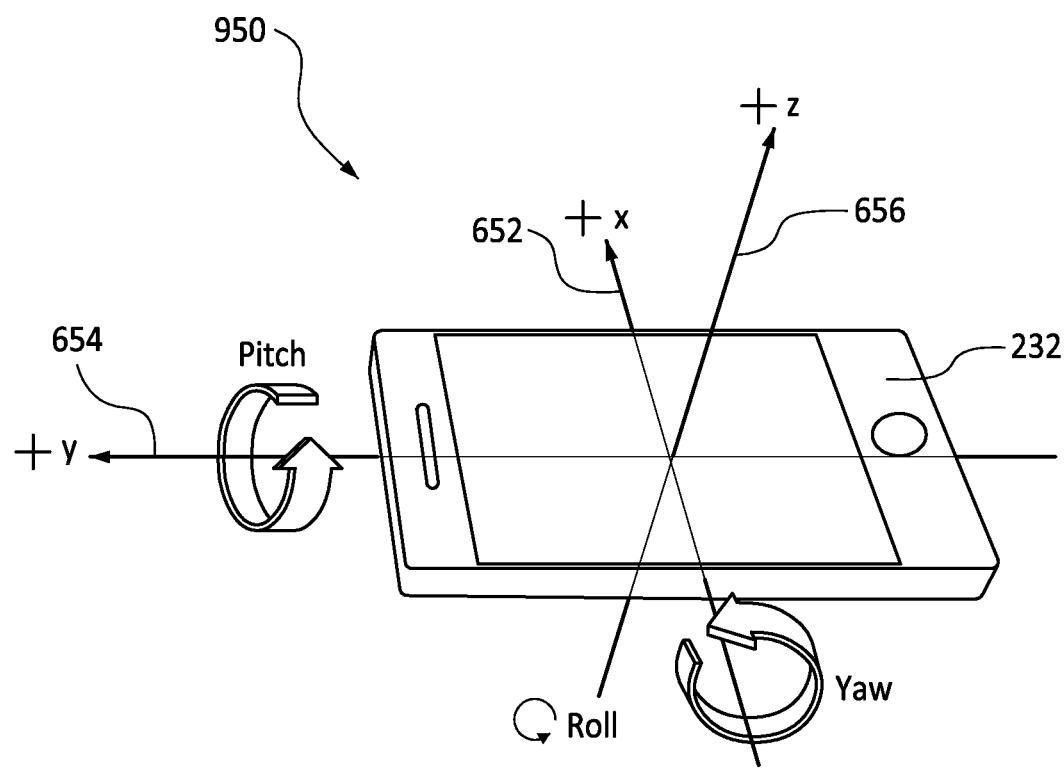
FIG. 6C is a diagram showing a preferred coordinate system for a user device.

Referring to FIG. 6C, a "correct" orientation of user device 232 will be described using a preferred coordinate system 650. Axis 652 is defined as the "x" axis or "yaw". Axis 654 is defined as the "y" axis or "pitch". Axis 656 is the "z" or "roll". User device 232 is shown in an orientation where the onboard camera is hidden. The camera faces in the direction "−z" along axis 656. In a preferred embodiment, the user device is in "correct" orientation for use in short-range mode when axis 656 is directed toward the object in the "−z" direction. Axis 652 is held perpendicular to the horizon. Axis 654 is held parallel with the horizon. As a result, axis "y" is exactly horizontal and axis "x" is exactly vertical. Axis 656 is directed to the horizon and is presumed to be facing directly away from the user in the −z direction. Hence, in a preferred embodiment, the pitch angle should be 0°, the roll angle should be 0°, and the yaw angle should be 0°. The position and orientation are updated every time user device 108 is moved. Relative positions of the user device are determined by comparing the position sensor readings in short succession and then subtracting the later set of position readings from the earlier set of position readings to determine a delta. A delta in any position reading is considered a change in position.

Figure 6D:
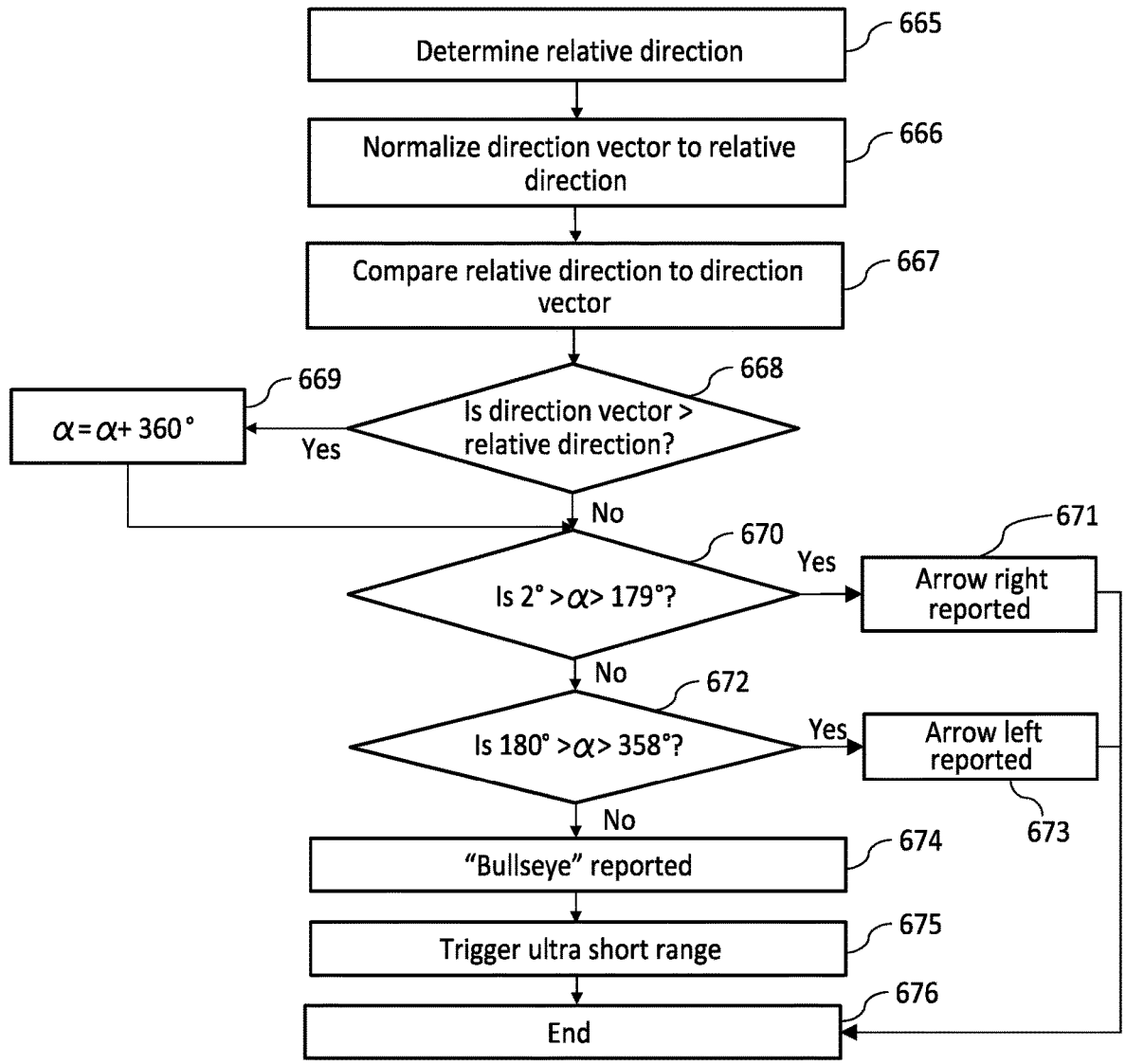
FIG. 6D is a flowchart of a preferred method of determining the orientation of a display arrow.

Referring to FIG. 6D, a method of displaying a directional element on the user device will be described. At step 665, a relative direction of the z-axis for the user device is determined from the position sensors and stored in memory. In a preferred embodiment, the relative direction is obtained by mapping a first GPS position of the user device to the first relative position reported by the position sensors and then mapping a second GPS position of the user device to the second relative position reported by the position sensors. The mapping process in one embodiment neglects changes in roll and yaw. As the user device moves, the most recent GPS position of the user device is taken as the second relative position and the next most recent GPS position is taken as the first relative position. The angle of the relative direction is taken clockwise from true north. The magnitude of the relative direction is taken as the distance between the first position and the second position. At step 666, the direction vector is normalized to the relative direction by aligning the first set of GPS coordinates of the direction vector with the first set of GPS coordinates of the relative direction. In one embodiment, an alignment is achieved by changing the first set of GPS coordinates of the direction vector to match the first set of coordinates of the relative direction.

At step 667 a comparison is made between the angle of the relative direction and the angle of direction vector to arrive at a difference angle "alpha." The comparison is made in a clockwise fashion from the relative direction to the direction vector.

At step 668, a decision is made as to whether or not the angle of direction vector is greater than the angle of the relative direction. If so, then the method proceeds to step 669. If not, the method proceeds to step 670. At step 669, 360° is added to alpha and the method moves to step 670.

At step 670, if the angle alpha is between 2° and 179° then the process moves to step 671 where an "arrow right" is reported. The process then moves to 676 and concludes. If not, the process moves to step 672. At step 672, if the angle alpha is between 180° and 358° then an "arrow left" is reported at step 673 and the method concludes at step 676. If not, then a "bullseye" is reported at step 674, and the process moves to step 675. At step 675, the ultra-short-range image recognition routine is triggered as will be further described.

Figure 6E:
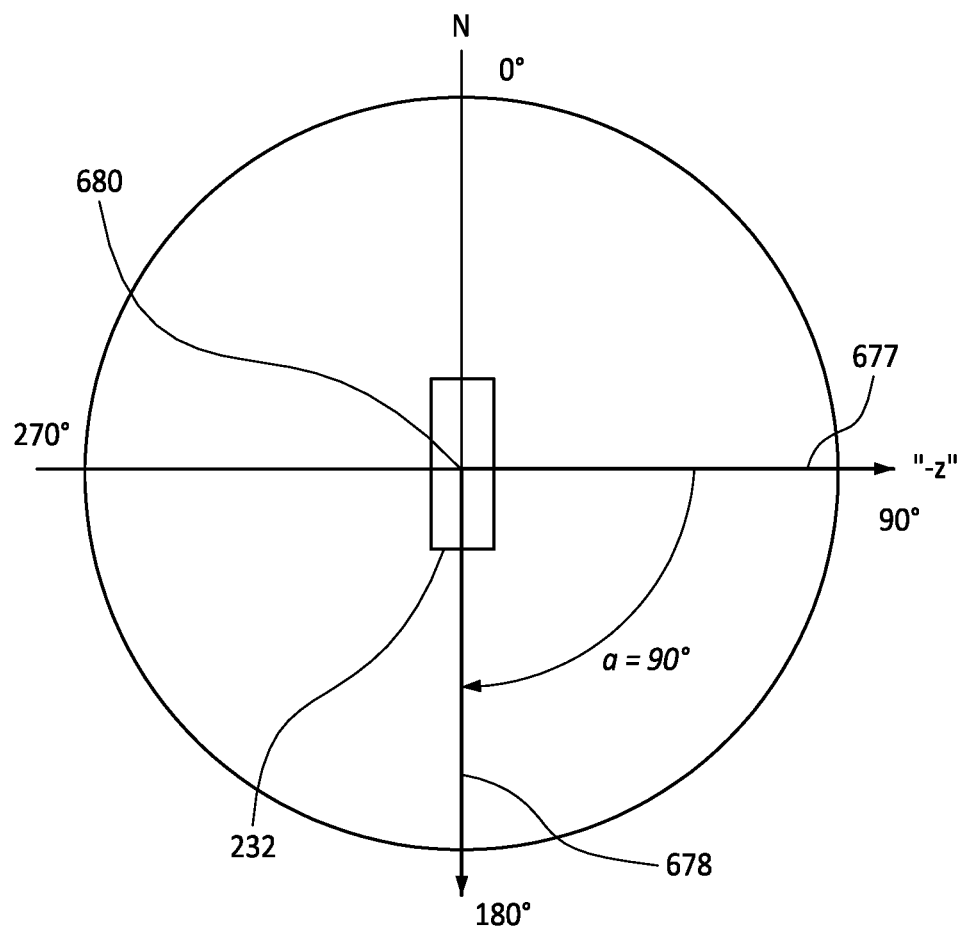
FIG. 6E is a graphical example of a preferred method of determining the orientation of a display arrow.

Referring to FIG. 6E, a graphic example of the calculation of a "right" arrow decision is described. In this example, user device 232 is located at point 680 and relative direction 677 is shown at 90° from true north (0°). Direction vector 678 is shown at 180°. The offset angle "alpha" is calculated in a clockwise manner from the relative direction to the direction vector. In this example, α is reported to be 90° (180°-90°), which is between 20° and 179°, so an "arrow right" will be reported.

Figure 7A:
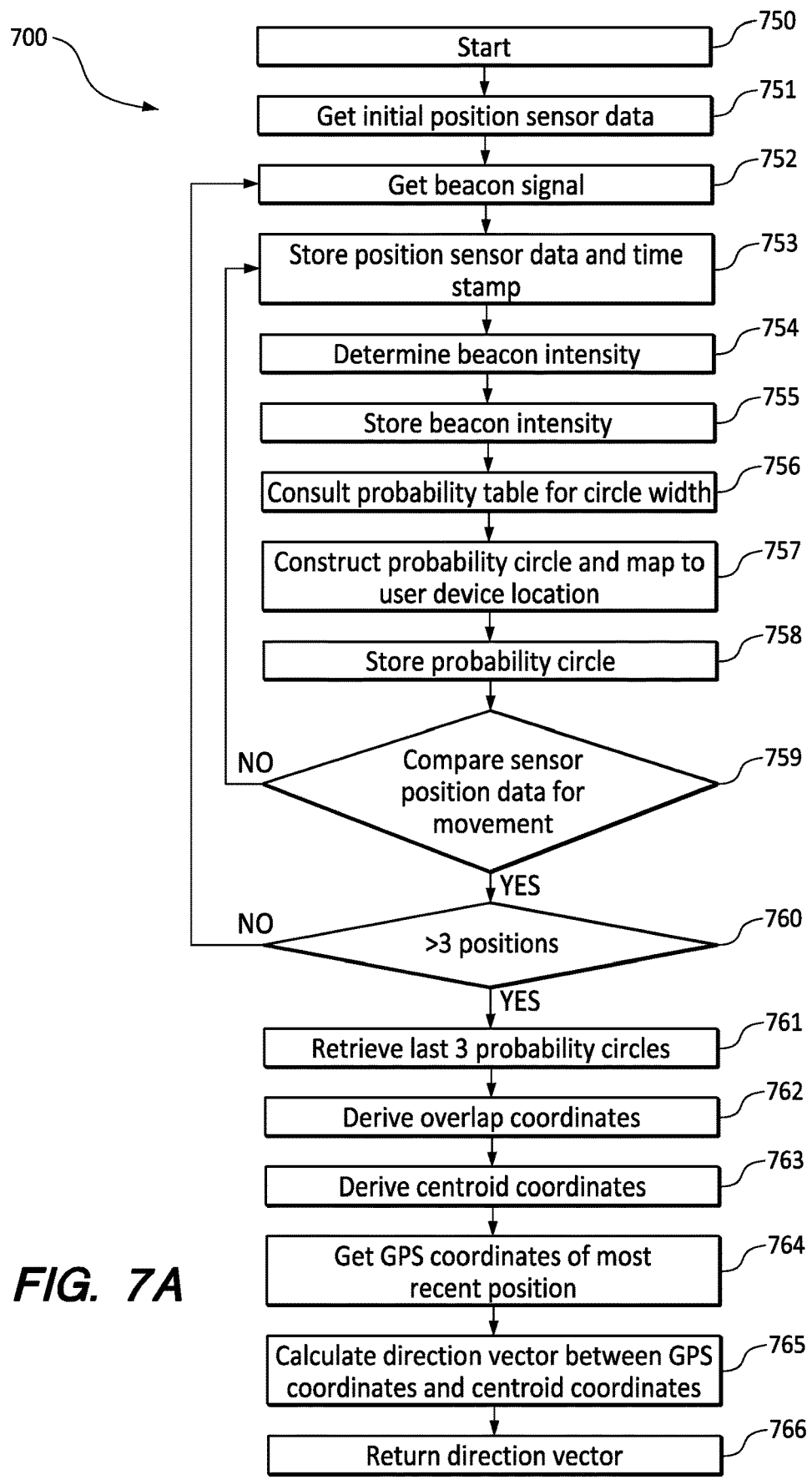
FIG. 7A is a flowchart of a preferred embodiment of a method to determine a short-range beacon tag location and return a direction vector definition.

Referring to FIG. 7A, a preferred embodiment of a method 700 for locating a beacon tag in short-range mode will be described.

At step 750, the method starts. At step 751, the user device consults the onboard position sensors to locate its initial position coordinates. At step 752, a beacon signal is received by the user device. At step 753, the position coordinates are stored in memory along with a time stamp of when they were received. At step 754, the beacon signal is analyzed for intensity. At step 755, the beacon intensity is stored in memory. At step 756, an estimated distance table is consulted to determine a maximum and a minimum estimated distance. In this way, the signal strength of the beacon signal is converted into a range of possible distances. The weaker the signal, the greater the distance between the user device and the tag. The stronger the signal, the lesser the distance between the user device and the tag. For any given signal strength, a maximum and a minimum distance are provided in the table.

At step 757, a "probability circle" is constructed and mapped to the initial position of the user device as of the time of the time stamp, as will be further described.

Each probability circle is determined by drawing two concentric circles centered at the location of the user device. The larger of the two circles has a radius of the maximum distance from the estimated distance table. The smaller of the two circles has a radius of the minimum distance from the estimated distance table. The construct of the probability circle comprises the locus of points between the first circle and the second circle.

At step 758, the locus of points comprising the probability circle and a timestamp of when it was recorded are stored in memory.

At step 759, the position sensors are again polled to determine if the user device has been moved. This is done by comparing the present position to the initial position. If so, the method moves to step 760. If not, the method returns to step 753. At step 760, a determination is made as to whether or not sufficient data exists to plot three (3) relative positions of the user device based on position sensor data and an overlap between all three probability circles. If not, the process returns to step 752. If so, the process moves to step 761.

At step 761, the dimensions and relative positions of the last three probability circles are retrieved from memory. At step 762, three (3) sets of overlaps are calculated, a first overlap set between the first and second probability circles, a second overlap set between the second and third probability circles, and a third overlap set, between the first, second, and third probability circles. Each set of overlaps forms a plane figure which consists of the locus of points which are common to each of the circles. A set can consist of one or more plane figures. At step 763, a centroid is calculated for the third overlap and its GPS position determined, as will be further described.

At step 764, the GPS coordinates of the most recent position of the user device are retrieved and stored.

At step 765, a direction vector is calculated between the most recent GPS position of the user device and that of the centroid. The angle of the direction vector is positive from 0° due north from the user device to the centroid. The direction vector proceeds from the GPS coordinates of the user device to the centroid. The magnitude of the direction vector is the distance in feet, from the most recent position of the user device to the centroid. At step 766, the direction vector, is returned.

Figure 7B:
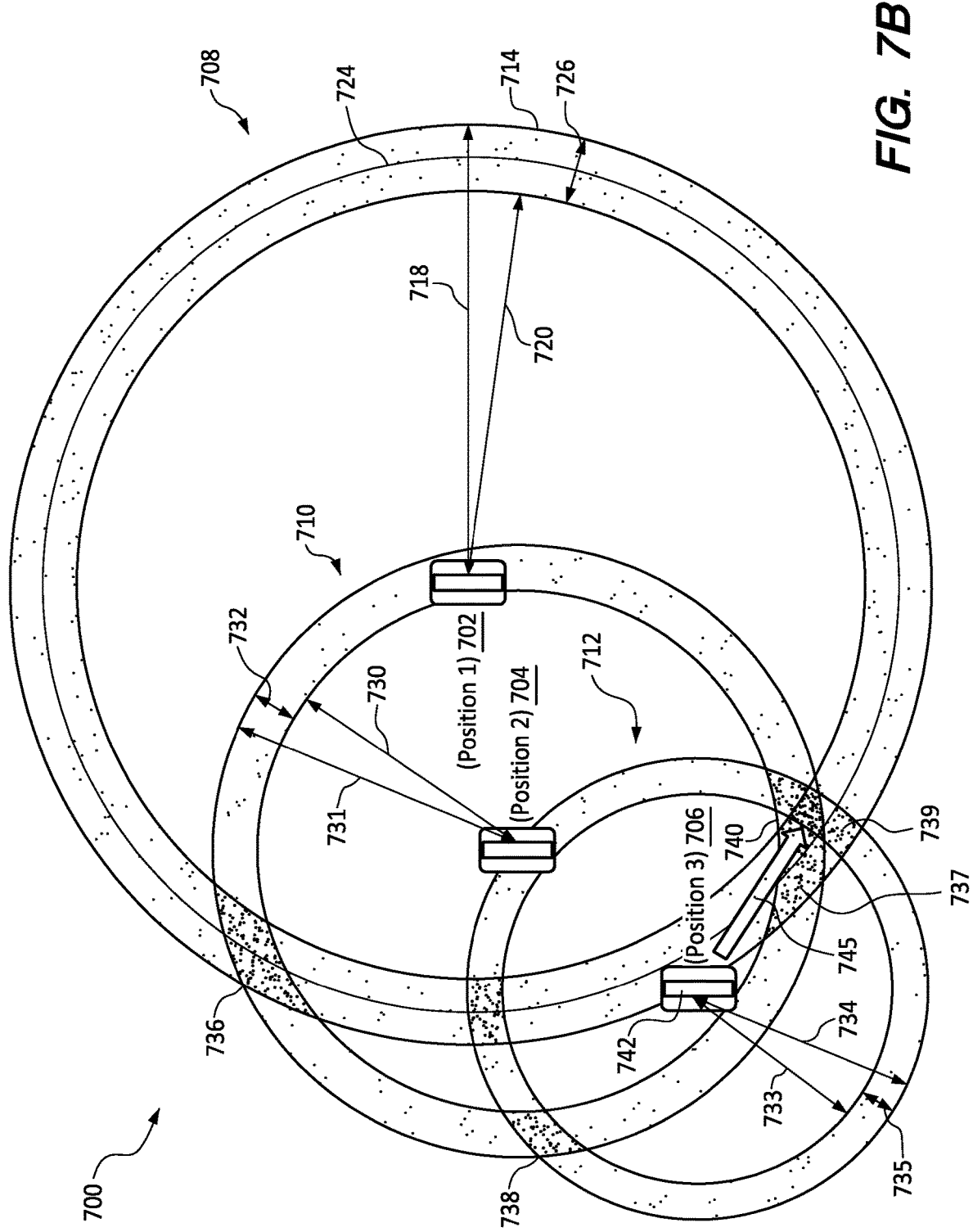
FIG. 7B is a graphical depiction of probability circles and centroids used in a preferred method to determine a beacon tag location.

Referring to FIG. 7B, diagram 700 is a graphical depiction of an example of the determination of three (3) probability circles and a centroid. For a first beacon signal, the user device is located at Position 1, 702 at time 1. For a second beacon signal, the user device is located at Position 2, 704 at time 2. For a third beacon signal, the user device is located at Position 3, 706 at time 3.

Probability circle 708 identifies a locus of points where the beacon tag may be when the user device is in Position 1 based only on beacon signal strength. Likewise, probability circle 710 identifies a locus of points where the beacon tag may be when the user device is in Position 2. Likewise, probability circle 712 identifies a locus of points where the beacon tag may be when the user device is in Position 3.

In this example, at Position 1 for a signal strength of 0-2-milliWatts (mW), a radius of 25 ft is shown at 720 and a radius of 30 ft is shown at 718. The difference, 726, is 5 feet. Probability circle 724 is plotted around Position 1 having inside radius 720, outside radius 714, and a width 726. This probability circle represents the possible locations of the tag when the user device is in Position 1.

Likewise, when the user device is moved to Position 2, a radius of 15 ft is shown at 730 and radius of 20 ft is shown at 731. This represents a signal strength of between 40-60 mw. The difference between 730 and 731 is 5 feet. A circle is drawn around Position 2 having an inside radius at 730, an outside radius at 731, and having a width 732 of 5 feet. This probability circle represents the possible locations of the tag when the user device is in Position 2.

Likewise, the user device is moved to Position 3, radius of 1 foot is shown at 733 and radius of 5 ft. is shown at 734. This represents a signal strength of between 100-120 mw. The difference 735 between 733 and 734 is 4 ft. The circle is drawn around Position 3 having an inside radius at 733, an outside radius at 734, and having a width of 4 ft. This probability circle represents the possible locations of the tag when the user device is in Position 3.

Since all three probability circles are stored in memory and are associated with relative positions of the user device at different points in time, the overlaps between them can be used to calculate the location of the beacon tag when the user device is at Position 3. The overlap between probability circle one and probability circle two is shown at 736 and 737. The overlap between probability circle two and probability circle three is shown at 738 and 739. The overlap between probability circle one, probability circle two and probability circle three is shown at 740.

The estimated location of beacon tag 128 is calculated as the centroid of area 740. Direction vector 745 is then calculated having a start point 742 at the GPS coordinates associated with Position 3 and an end point 770 at the centroid of area 740.

Figure 7C:
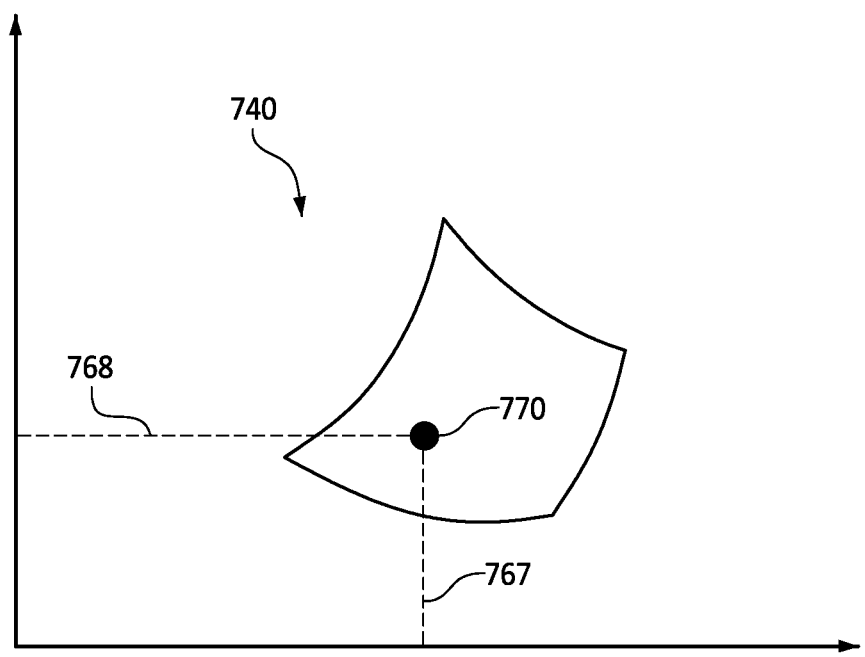
FIG. 7C is a graphical depiction of a centroid of a planar body derived from probability circles.

Referring to FIG. 7C, the centroid of area 740 is further described. For a plane figure, such as the third overlap 740, the centroid, or barycenter is calculated as:

$$C_x = \frac{\int xS_y(x)dx}{A} \quad \text{Eq. 1}$$

$$C_y = \frac{\int yS_x(y)dx}{A} \quad \text{Eq. 2}$$

where:
A is the area of the area 740;
$S_y(x)$ is the length line 768; and,
$S_x(y)$ is the length line 767.

Figure 8:
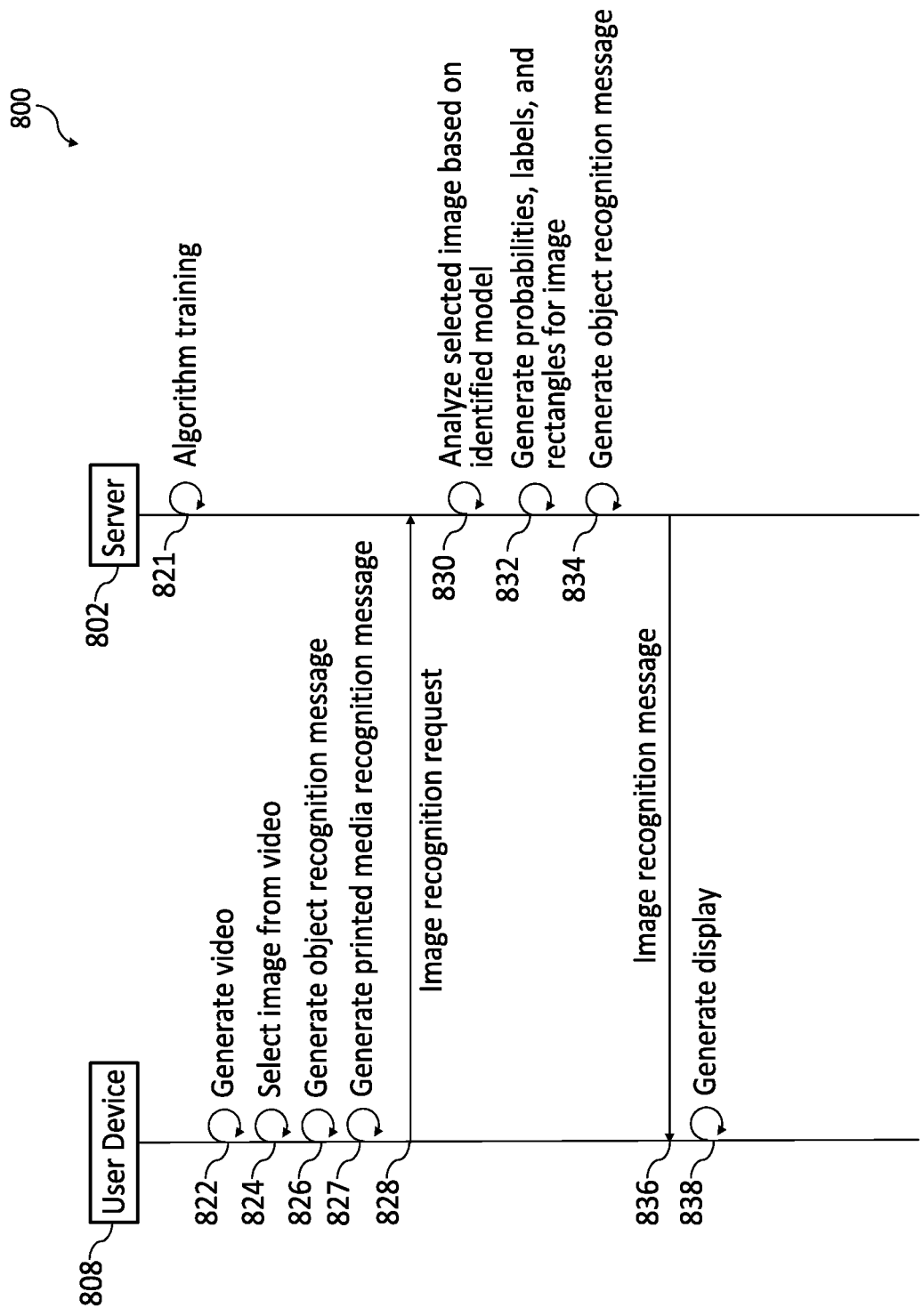
FIG. 8 illustrates a sequence diagram of a method of identifying an object from a video image when the system is in ultra-short-range.

Turning to FIG. 8, sequence 800 shows a method of identifying an object using ultra-short-range with image recognition. Server 802 provides image recognition services. In a preferred embodiment, the image recognition services include, but are not limited to, Google Cloud Platform Cloud Vision API, Microsoft Azure Computer Vision API, 5G or other cellular service and Amazon Web Services Amazon Recognition.

At step 821, the image recognition service is trained to recognize the object with the training video taken during system initialization.

At step 822, user device 808 generates a real time video display. In a preferred embodiment, the video display is generated by the camera onboard user device 808.

At step 824, a fixed image is selected from the video display. In a preferred embodiment, the fixed images are taken from the video at 400 milliseconds intervals. In a preferred embodiment, the fixed image is captured when the ultra-short-range routine is triggered.

At step 826, user device 808 generates an image recognition request that includes a selected fixed image and an object recognition model. The object recognition model is defined by the object recognition file that was generated by the system during system initialization and the required model parameters.

Alternatively, at step 826, the image recognition request may not be sent because the user device 808 may recognize printed media on the object. For example, the camera on user device 808 may include QR reader software, or a processor with requisite corrective processing code (e.g., Reed-Solomon error correction) such that one or more images taken at step 822 may be used by user device 808 to recognize identifying printed media.

Alternatively, at step 826, the image recognition request may include a printed media recognition model.

At optional step 827, user device 808 generates a printed media recognition message. The printed media recognition message may allow for object identification by recognizing the identifying printed media as an alternative to requesting object identification from server 802. Some embodiments use both object identification and printed media recognition.

At step 828, the image recognition request is sent from user device 808 and is received by server 802. Step 828 may include sending to server 802 the printed media recognition message, together with, or as an alternative to, the image recognition request.

At step 830, server 802 analyzes the selected fixed image based on the object recognition model. In a preferred embodiment, the object recognition model describes weights, layers, and structure relevant to an artificial intelligence image recognition algorithm.

At step 832, probabilities, labels and image location coordinates are generated by server 802. In preferred embodiment the image location coordinates are defined by an upper left corner definition and a lower right corner definition of a rectangle within the selected fixed image where an image of object 830 should be present. The probabilities represent the confidence interval that the artificial intelligence image recognition algorithm has correctly identified the object.

At step 834, server 802 generates an object recognition message that includes the probabilities, labels, and image location coordinates.

At step 836, the object recognition message is sent from server 802 to user device 808.

At step 838, user device 808 generates a display. The display includes the probabilities, labels, and an image location rectangle generated from the upper left and lower right corner coordinates, overlaid onto the selected fixed image. The display also includes an image of the object and an image of the owner. In this way, at ultra-short-range, a visible rectangle is drawn around the object so that the user can easily locate it. The display may also include multiple arrows or other moving or flashing graphics, such as arrows to indicate the absolute location of the object. Alternatively, the multiple arrows or other moving or flashing graphics may indicate the absolute location of recognized printed media specific to the object, such as a QR code.

Figure 9A:
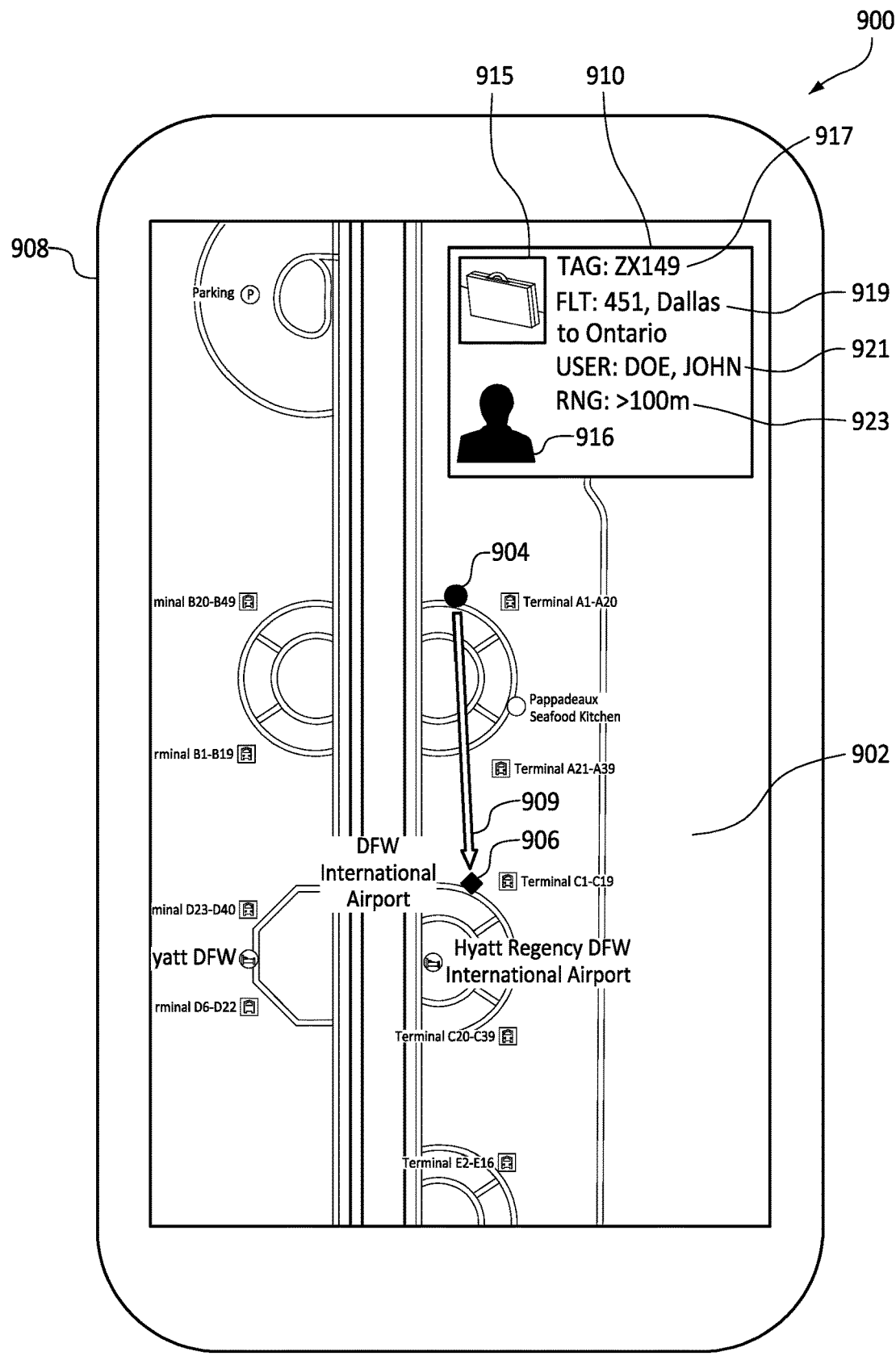
FIG. 9A is an illustration of a display screen of a user device in long-range mode.

Referring to FIG. 9A, "long-range" mode display 900 is shown on user device 908. Long-range mode display 900 includes map 902 and information box 910.

Map 902 displays the current location of the user device as icon 904. Map 902 also displays the location of the tag as icon 906. The path between user device 908 is shown as arrow 909. Arrow 909 indicates the direction of travel in order to bring user device 908 closer to the location tag with which it is paired.

Information box 910 shows image 915 of the object paired with the tag, image of the owner 916, tag identifier 917, flight identifier 919, a name of the user 921, and range information 923. In this example, the range information indicates that the tag is greater than 100 meters away from the location of the user device. In this way, the information box displays both a picture of the object and a picture of the user, thereby permitting instant authentication of ownership of the object by the user.

Figure 9B:
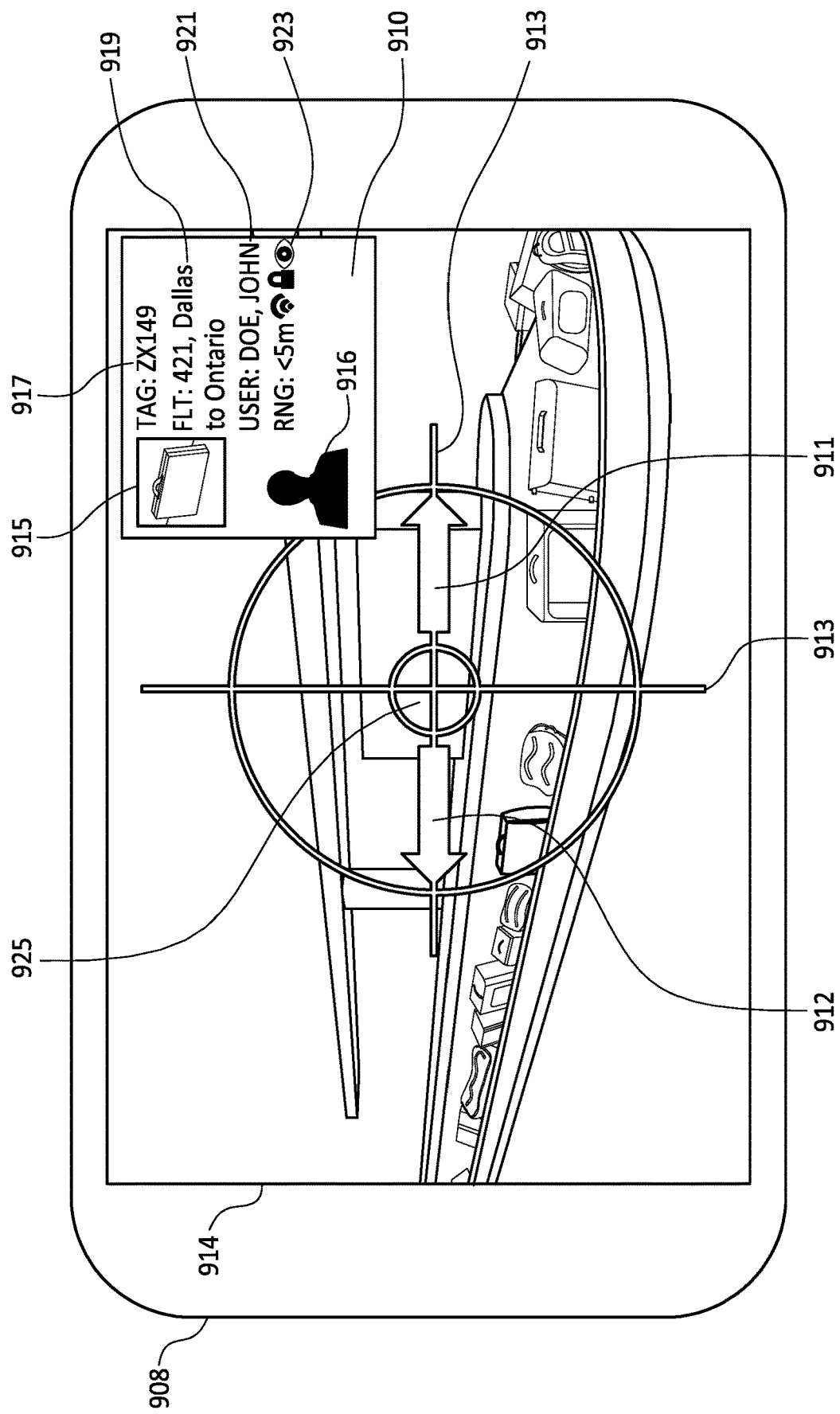
FIG. 9B is an illustration of a display screen of a user device in short-range mode.

Referring to FIG. 9B, a display in "short-range" mode is shown. Crosshairs 913 are shown in a fixed position in the display. Camera video image 914 displays a live video feed from the user device camera. Either "right" arrow 911 or "left" arrow 912 is displayed. Each arrow when displayed indicates a direction which the user device must be turned to reach the location tag. "Bullseye" 925 is central in the video image and is highlighted when the location tag is centered in the display.

Figure 9C:
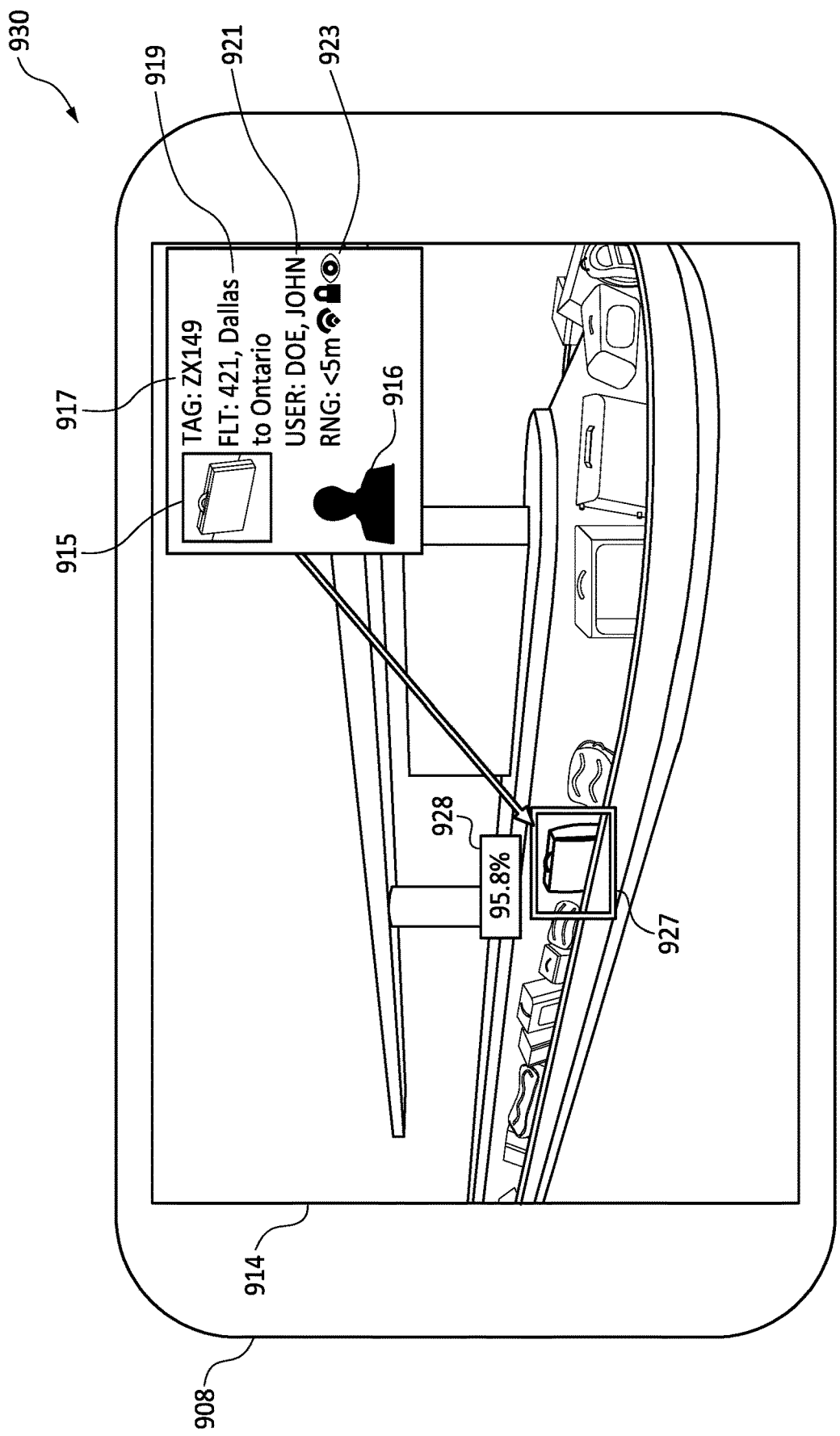
FIG. 9C is an illustration of a display screen of a user device in ultra-short-range mode.

Referring to FIG. 9C, "ultra-short-range" mode display 930 is shown. Range information 923 indicates tag proximity. In this example, the tag is less than 10 feet away from the user device. User picture 916 and object picture 915 are also displayed. Rectangle 927 indicates the image as recognized. Confidence interval 928 indicates the likelihood that the image of the object is correctly identified.

Figure 9D:
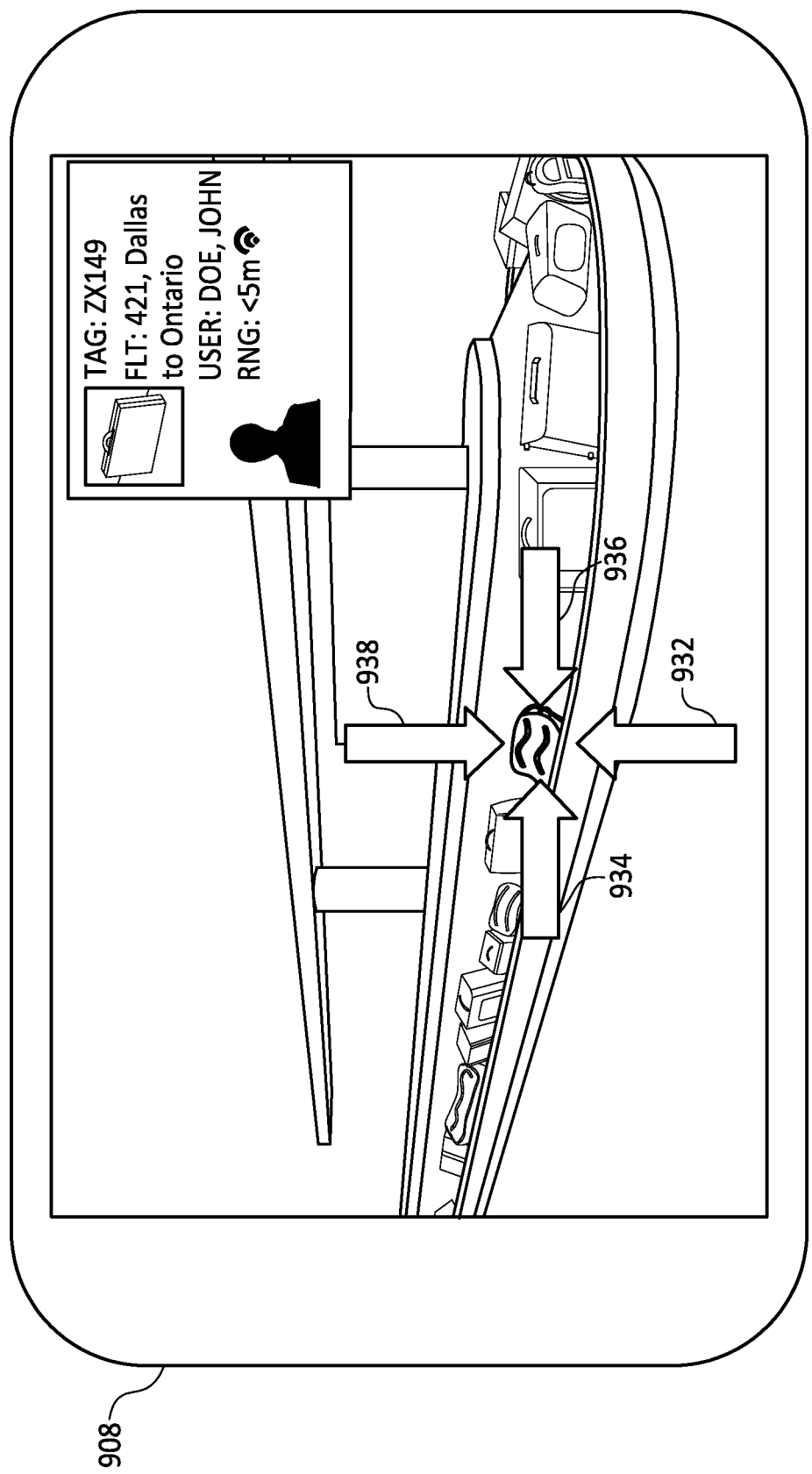
FIG. 9D is an illustration of an alternate display screen of a user device in ultra-short-range mode.

Referring to FIG. 9D, an alternate "ultra-short-range" display is shown. Four arrows, 932, 934, 936, and 938 are displayed centered on the object associated with the tag.

Augmented reality superimposes digital content over live video feeds to make it seem that it is part of the world. This allows a user to enhance the world around them in many ways. There are many inanimate objects that users interact with every day, including, but not limited to, credit cards, checks, street signs, prescription vials, trophies, etc. Augmented reality can bring these inanimate objects to life to provide entertainment, security, and everyday information. To bring objects to life via video feed, marker-based scanning must be performed by a user's augmented reality device, such as a smartphone, wearable, smart device. The device's camera is able to search and find marked objects when using a marker-based system. Once the augmented reality device scans the augmented reality fingerprint marker, the marker-based system superimposes a digital image or information onto the augmented reality device display. Accordingly, there is a need for an augmented reality system that can be used for numerous objects, such as financial items, clothes, prescriptions, and many other items.

Figure 10:
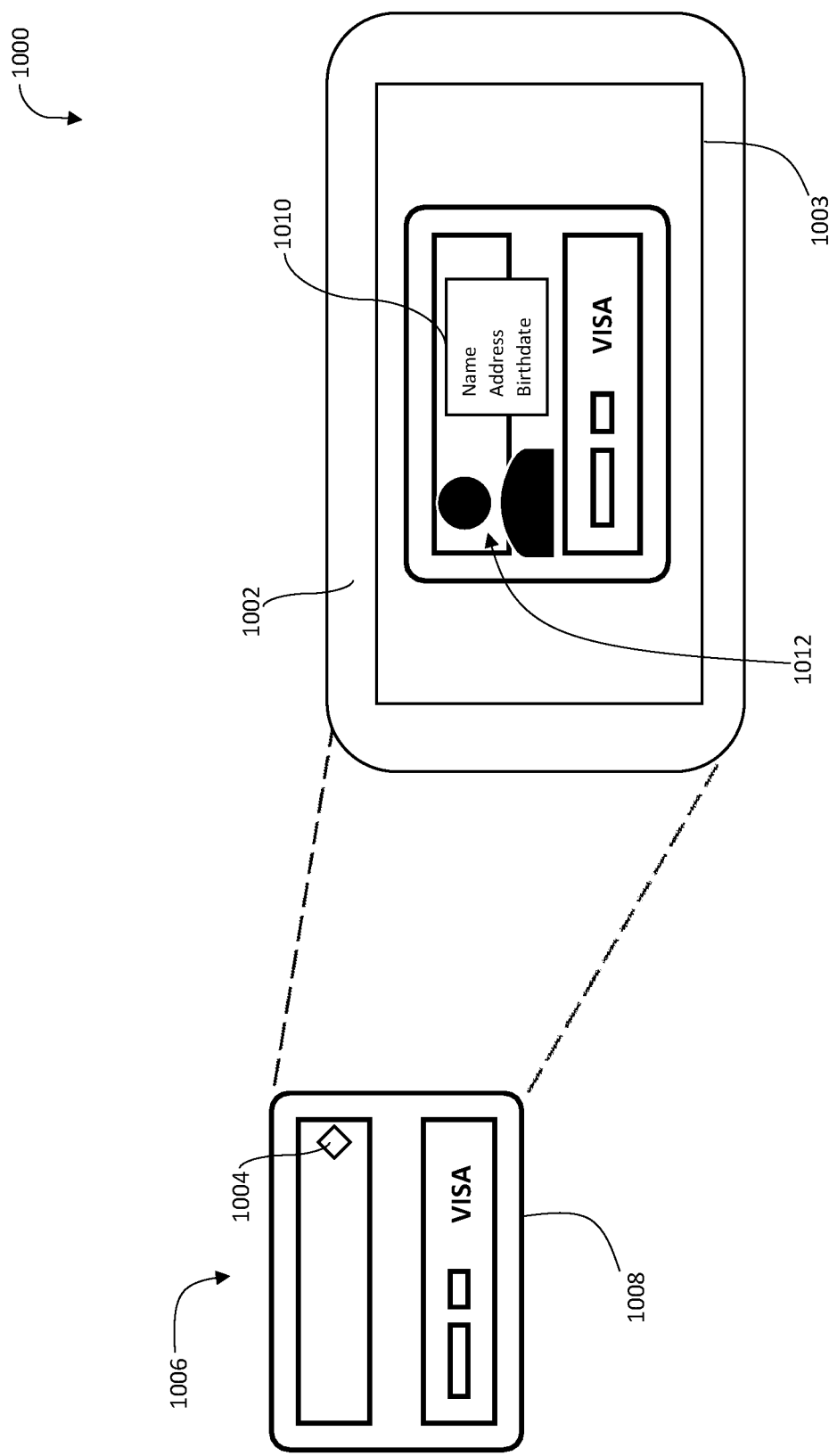
FIG. 10 is an illustration of a financial transaction card augmented on a user device.

In one embodiment, as shown in FIG. 10, an augmented reality system 1000 comprises a user device 1002 having a camera and screen 1003 with augmented reality software and an augmented reality fingerprint marker 1004 positioned on an object 1006, such as a financial transaction card 1008 (e.g., credit card or debit card), check, or other financial item (collectively referred to as a "financial object"). The user device 1002 may be a smartphone, computer, tablet, glasses, or any device that is capable of performing augmented reality. The user device 1002 and the augmented reality software maps the environment and reads the augmented reality fingerprint marker 1004, which superimposes digital information 1010 received from the augmented reality fingerprint marker 1004 over the real-world objects 1006 displayed on the user's device 1002. For example, a user, such as a store clerk, could take a customer's credit card 1008 during the check-out process and scan the credit card 1008 with the user device 1002, which could then superimpose digital information 1010 about the customer on the user device 1002 (i.e., augment reality), including photo identification 1012 of the owner of the card, as illustrated in FIG. 1.

Credit card theft and fraud are ongoing problems. To combat these problems, credit card companies have begun using chips in their cards. While this may aid in preventing cards from being copied, it does not prevent a thief from using a stolen card. However, an augmented display of the card's owner, at time of use, could reduce theft and fraud significantly. Accordingly, there is a need for an augmented reality system that enables verification of ownership of a credit card, check, professional license, security clearance, or other object. It is important to note that the credit card comprises the augmented reality fingerprint marker, which contains information about the customer. The user device 1002, in tandem with the augmented reality software, produces digital information 1010 that is read from the augmented reality fingerprint marker. The information that is superimposed over the credit card 1006 may be, but is not limited to, a name, address, photo, etc. It will be appreciated that the augmented reality system 1000 can assist financial institutions in detecting fraud, having increased security, and creating an accurate financial system. If, for example, a credit card is stolen, the retailer or other credit card processor may scan the credit card to analyze the photo and other information to determine that the card is being used by its rightful owner.

Figure 11:
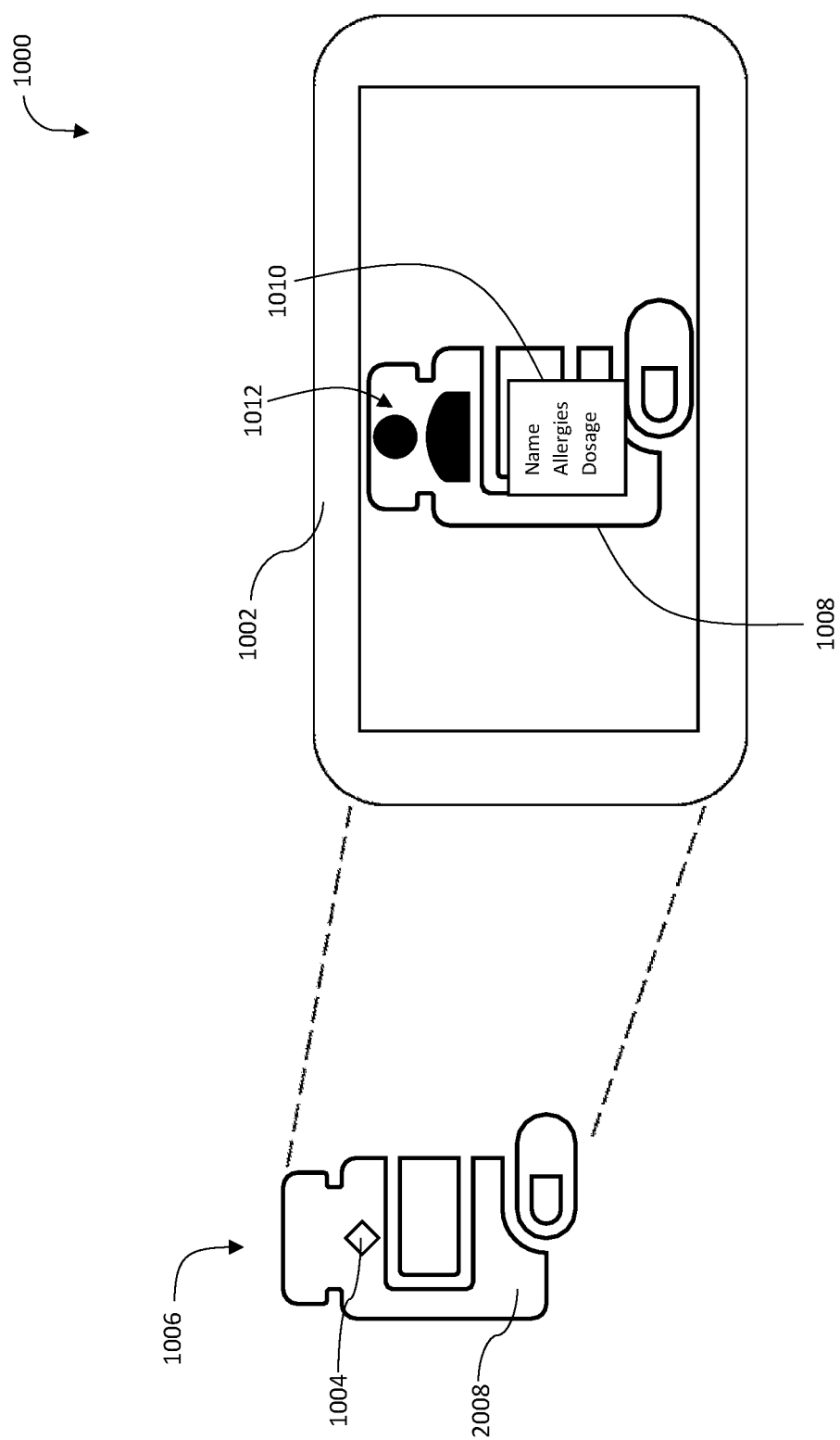
FIG. 11 is an illustration of a pharmaceutical vial augmented on a user device.

In one embodiment, as shown in FIG. 11, the object 1006 may be a pharmaceutical vial 2008. It will be appreciated that other vials may be used, such as a supplement vial. The user device 1002 and the augmented reality software maps the environment and reads the augmented reality fingerprint marker 1004 on the pharmaceutical vial 2008 (or other pharmaceutical item), which superimposes digital information 1010 received from the augmented reality fingerprint marker 1004 over the pharmaceutical vial 1008 displayed on the user's device 1002. This information may be patient verification information, such as a photo 1012 of the patient with name and birthdate, allergies, dosage, or other information. In some embodiments, the displayed information may be the number of pills left in the vial based upon its weight. Once the pills reach a certain number (i.e., weight), the augmented reality fingerprint marker 1004 may automatically send instructions to the smart device to reorder the prescription or supplements via, for example, a transceiver. Additionally, in one embodiment, the pharmaceutical vial

2008 may comprise smart sensor strips, with possible accelerometer devices that will record date and time of consumption.

Also, in an alternate embodiment, the pharmaceutical vial may comprise a strip or lid which will glow or change color. In other words, the change in color of the strip or lid could notify a user when a pill has been taken, such as green when taken, or red as not taken. The color of the lid or strip may also reset automatically when starting the next day's requirement of pre-prescribed intake. It will be appreciated that the lids and/or colored strips on the vial 2008 will be additional measures of verification of intake instructions, will add more stability and improve health care management, and enhance prescriber's adherence to proper medication intake. It will further be appreciated that the lids and/or colored strips may help to monitor and coordinate with professionals, family, or other caregivers for improved health care management.

This information may not only be helpful to a pharmacy or the individual taking the medication but may also be useful in preventing opioid abuse. Opioid abuse has become a national concern and the augmented reality system could assist in combating the abuse. Similar to the credit card scenario, authorities, such as the police, could scan the prescription vial to find information quickly to determine the proper owner of the medication.

In one embodiment, the reality fingerprint marker 1004 may be utilized in a hospital setting. For example, the augmented reality fingerprint marker 1004 could be placed on a patient's clothing or other belonging, on their personal file information that is handled by the nurse, or in any other location. In a manner similar to previous embodiments, a medical provider could scan the augmented reality fingerprint marker 1004 with the user device to receive information about the patient. For example, the augmented reality fingerprint marker 1004 could be placed on the patient so that a medical provider could scan the marker with the user device 1002, which would overlay digital information 1010 on the user device screen. It will be appreciated that the digital information 1010 displayed could be information about the status of the patient, their health issues, when medication was last taken, who was the last medical provider to review the patient, when medication was last administered and needs to be administered, insurance, and any other personal information important during a hospital stay. It will further be appreciated that the augmented reality system used in a hospital setting may assist hospital staff in taking better care of a patient. For example, when there is a shift change between nurses, it will be easier for the new nurse to quickly assess the status of the patient so that the nurse may take proper care of the patient.

In one embodiment, the object may be a license plate. For example, the license plate may have an augmented reality fingerprint marker 1004 embedded thereon, which, when scanned, displays information relating to the vehicle and driver. To appreciate the benefits of the embedded augmented reality fingerprint marker, law enforcement, or other individuals, could scan the license plate with their user device to retrieve important information. In use, police officers, after pulling over a vehicle, could scan the license plate without exiting their vehicles. This would provide safety for the officer and vital information before approaching the driver. The digital information superimposed on the vehicle could include personal information (name, address, photo), driver's license information, make and model of the vehicle, outstanding warrants or crimes associated with the vehicle and its driver, and any other valuable information.

In one embodiment, an augmented reality system comprises a user device with augmented reality software and an augmented reality fingerprint marker for use on clothing, such as shirts, coats, pants, shoes, etc. For example, the augmented reality fingerprint marker may be placed on a child's coat. If a child were to be kidnapped, the augmented reality fingerprint marker could assist authorities to find the child. Law enforcement officers could scan children with a user device. When the user device locates the augmented reality fingerprint marker, information can be displayed about the child, such as name, address, phone number, etc.

Additionally, during a murder or kidnapping investigation, clothing may be found that can assist law enforcement. If humans remains are found with the clothing, the clothing may be scanned to immediately return an identity of the remains. The augmented reality system may also assist law enforcement, or other people, to locate and identify living individuals from their clothing. Further, it could also be envisioned that an augmented reality fingerprint marker could be placed on the clothing of an undercover law enforcement officer. For example, an undercover law enforcement officer could have an augmented reality fingerprint marker attached somewhere on his clothing. This would allow other law enforcement officers to scan a group of individuals to know whether there are other law enforcement officers so as to not interrupt an operation and protect their fellow officers.

Figure 12:
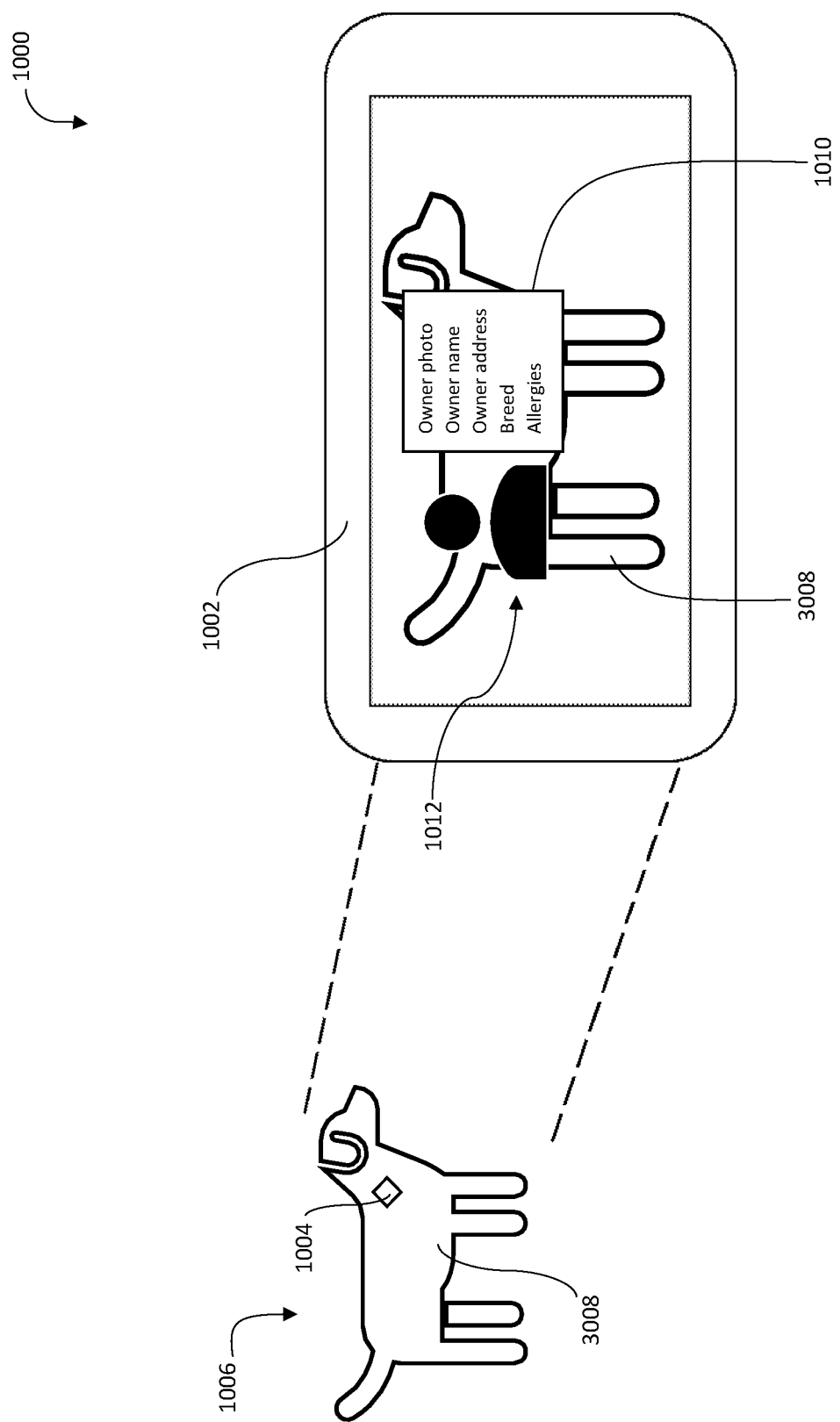
FIG. 12 is an illustration of a pet augmented on a user device.

Referring to FIG. 12, in one embodiment, an augmented reality system 1000 comprises a user device 1002 with augmented reality software and an augmented reality fingerprint marker 1004 for use on a pet 3008 (which, as defined herein, is still an "object" 1006). The augmented reality fingerprint 1004 marker may be placed on a pet's clothes or on the pet's collar so that the pet 3008 may be identified through the user device. For example, a user may scan the augmented reality fingerprint marker 1004 on a pet 3008, such as a dog, with the user device 1002. After scanning the augmented reality fingerprint marker 1004, digital information 1010 about the pet 3008 may overlay the live video feed displayed on the user device 1002. The digital information 1010 may include, but is not limited to, a name and address of an owner, breed, medical needs, allergies, age, or any other information, such as a photo 1012 of the owner. Accordingly, the augmented reality fingerprint marker 1004 could be helpful when trying to find the owner of a lost pet 3008. Additionally, the user device 1002 may display additional superimposed information, such as one or more animated arrows (e.g., illustrated in FIG. 9B), guiding a user to an owner of a pet 3008. As discussed earlier herein, one or more beacons may be used to determine the position of the owner. For example, the owner of the pet 3008 may have a beacon coupled to a leash of the pet 3008. This allows a user to locate the owner of the pet 3008. In an alternative, the pet owner's smartphone be used as a location device, such as by using the GPS or other technologies of the phone. For example, a pet owner could purchase a collar having a fingerprint marker 1004 thereon. The user may, during the setup of the fingerprint marker (e.g., inputting the information to be displayed on a user's screen when scanned by a user's device 1002) authorize the activation of the location technology of their smartphone when someone scan's the fingerprint marker 1004 on the collar. For short distances, other wireless technologies may also be utilized, such as Bluetooth®. When combined with short-distance technologies, the overlay of arrows on the user's screen is beneficial to direct the user to the pet owner in much the same way as locating the luggage in FIGS. 9B-9D and as discussed herein for the system for locating an object. The entire process of FIGS. 9A-9D may be used not only with pets, but with other objects 1006 described herein, such as prescription vials, credit cards, clothing, or other items that may become lost and be in need of return to a user.

In one embodiment, an augmented reality system comprises a user device with augmented reality software and an augmented reality fingerprint marker for use with an object, namely, military identifications. When military personnel enter a secured area, a user can obtain the identification and scan the augmented reality fingerprint marker, allowing the user to see information displayed about the military personnel on their user device. It will be appreciated that the augmented reality system increases security for the military and creates an in-depth verification step when a user can evaluate the digital information generated from the augmented reality fingerprint marker. Some of the information that may be superimposed on the military identification may be name, rank, branch of military, etc.

In one embodiment, an augmented reality system comprises a user device with augmented reality software and an augmented reality fingerprint marker to be used with an object, namely, for advertisements, such as TV ads, in-store ads, print ads, internet ads, etc. For example, a TV ad about a toy may be displayed on a screen with the augmented reality fingerprint marker in the corner thereof. A user may then scan the augmented reality fingerprint marker that can superimpose the instructions, price, and a 3D model of the toy onto the user's device. It will be appreciated that other information may also be displayed or may be displayed in place of the previously mentioned information, such as reviews or manufacturer information.

Figure 13:
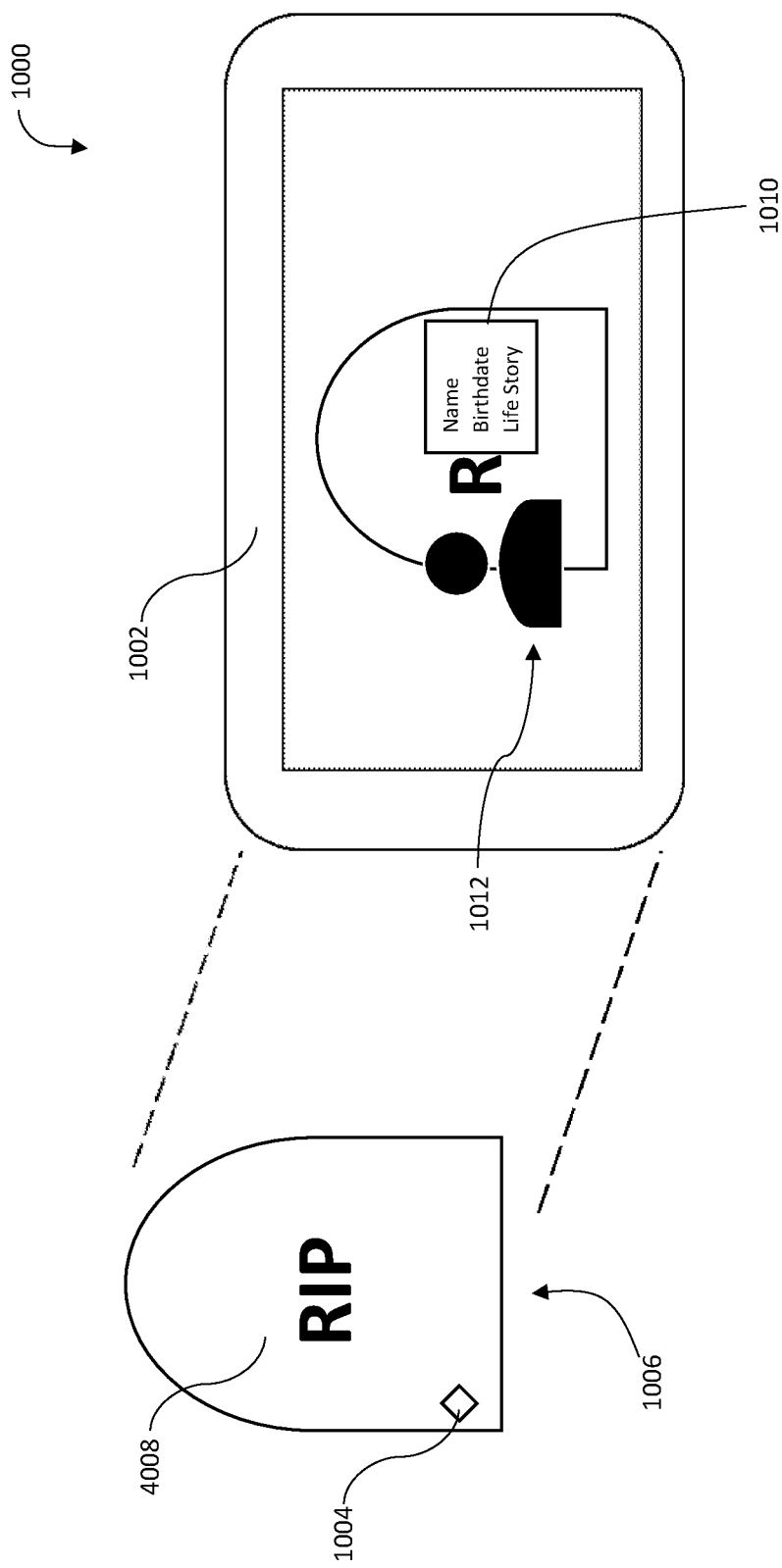
FIG. 13 is an illustration of a headstone augmented on a user device.

In one embodiment, as shown in FIG. 13, the object 1006 may include, but is not limited to, headstones 4008, in-wall internments, urns, etc. For example, a headstone 4008 may include an augmented reality fingerprint marker 1004, which, when scanned, can superimpose information 1010 about the deceased on a user device 1002 (e.g., smart device). Some of the information displayed on a user device 1002 may include, but is not limited to, a photo 1012, video, biography 1010, inspirational information, etc. A user may gain additional knowledge about the deceased easily and in an interactive manner.

In one embodiment, the object 1006 may be a hotel access card. For example, a user may scan the hotel access card using a user device 1002, which would then superimpose any information desired by the hotel. Such information could be a directory, a listing of events, emergency escape routes, among others.

As shown above, an object may be any number of persons, animals, or things. Interacting with those objects using augmented reality has not been taught in the prior art and greatly enhances the world around us.

While the use of "fingerprint markers" has been disclosed herein in relation to objects 1006, it is also contemplated that no marker is needed; rather, image recognition (as described earlier herein) or real-time recognition may be used to identify the object 1006 and superimpose information 1010 and owner photos 1012 thereon. For example, software for with with a camera may be able to identify an object based upon its shape, size, color, or other factors, allowing it to positively identify the object 1006 and display the ownership information 1010, 1012 associated therewith. Further, as discussed earlier herein regarding systems for locating an object, those methods and systems may be used with any object described herein that has a fingerprint marker. In other words, not only can the fingerprint marker be used to augment reality, a user may then locate the owner of the object using the systems and methods described earlier herein, which includes using a location tag or a smartphone of an owner.

The augmented reality system can help a user obtain information about many objects that may help in purchasing decisions, preventing fraud, preventing drug abuse, etc. It will be appreciated that the augmented reality fingerprint marker may be placed on any object. The augmented reality system is not limited to the previously mentioned embodiments and may include many other items that can receive an augmented reality fingerprint marker, such as trophies, food, etc.

It will be appreciated by those skilled in the art that modifications can be made to the embodiments disclosed and remain within the inventive concept. Therefore, this invention is not limited to the specific embodiments disclosed but is intended to cover changes within the scope and spirit of the claims.

What is claimed is:

1. An augmented reality system for identifying ownership of a pharmaceutical vial and displaying information related thereto, the system comprising:
   an augmented reality fingerprint marker coupled to a pharmaceutical vial;
   a user device having augmented reality software, a camera, and a display;
   the augmented reality software on the user device, programmed to:
      map the environment containing the pharmaceutical vial;
      scan and read the augmented reality fingerprint marker on the pharmaceutical vial; and
      generate and display superimposed digital identification information, on the pharmaceutical vial, received from the augmented reality fingerprint marker;
   wherein with the digital identification information superimposed over the pharmaceutical vial, a user is able to verify ownership of the pharmaceutical vial.

2. The system of claim 1, wherein the user device is a smartphone.

3. The system of claim 1, wherein the digital identification information includes a photo, age of the owner, type of medication, and information for taking the medication.

4. An augmented reality system for identifying ownership of clothing and displaying information related thereto, the system comprising:
   an augmented reality fingerprint marker coupled to clothing;
   a user device having augmented reality software, a camera, and a display;
   the augmented reality software on the user device, programmed to:
      map the environment containing the clothing;
      scan and read the augmented reality fingerprint marker on the clothing; and
      generate and display superimposed digital identification information on the clothing, received from the augmented reality fingerprint marker, the digital identification information including at least one of:
         i) name
         ii) photo
         iii) phone number
         iv) address;

wherein with the digital identification information superimposed over the clothing, a user is able to verify ownership of the clothing.

5. The system of claim 4, wherein the user device is a smartphone.

6. An augmented reality system for identifying a vehicle and its driver, the system comprising:
- an augmented reality fingerprint marker coupled to a vehicle;
- a user device having augmented reality software, a camera, and a display;
- the augmented reality software on the user device, programmed to:
  - map the environment containing the vehicle;
  - scan and read the augmented reality fingerprint marker on the vehicle; and
  - generate and display superimposed digital identification information, on the vehicle, received from the augmented reality fingerprint marker;
  - wherein with the digital identification information superimposed over the vehicle, a user is able to verify the vehicle and the driver.

7. The system of claim 6, wherein the user device is a smartphone.

8. The system of claim 6, wherein the digital identification information includes a name, address, photo, driver's license information, make and model of the vehicle, and outstanding warrants or crimes associated with the vehicle and its driver.

9. The system of claim 6, wherein the fingerprint marker is coupled to the vehicle via a license plate.

* * * * *